US008761239B2

(12) United States Patent
Imanaka et al.

(10) Patent No.: US 8,761,239 B2
(45) Date of Patent: Jun. 24, 2014

(54) IMAGE CODING APPARATUS, METHOD, INTEGRATED CIRCUIT, AND PROGRAM

(75) Inventors: Takaaki Imanaka, Osaka (JP); Takashi Hashimoto, Hyogo (JP)

(73) Assignee: Panasonic Corporation, Osaka (JP)

(*) Notice: Subject to any disclaimer, the term of this patent is extended or adjusted under 35 U.S.C. 154(b) by 575 days.

(21) Appl. No.: 13/056,762

(22) PCT Filed: May 31, 2010

(86) PCT No.: PCT/JP2010/003639
§ 371 (c)(1),
(2), (4) Date: Jan. 31, 2011

(87) PCT Pub. No.: WO2010/140338
PCT Pub. Date: Dec. 9, 2010

(65) Prior Publication Data
US 2011/0135285 A1 Jun. 9, 2011

(30) Foreign Application Priority Data
Jun. 1, 2009 (JP) .................................. 2009-131736

(51) Int. Cl.
*H04N 7/36* (2006.01)
*H04N 7/26* (2006.01)

(52) U.S. Cl.
CPC .... *H04N 19/00678* (2013.01); *H04N 19/00709* (2013.01); *H04N 19/00533* (2013.01)
USPC .................. 375/240; 375/240.12; 375/240.16

(58) Field of Classification Search
USPC ........................................ 375/240.12, 240.16
See application file for complete search history.

(56) References Cited

U.S. PATENT DOCUMENTS

| 5,731,850 | A | * | 3/1998 | Maturi et al. ................. 348/699 |
| 5,841,474 | A | * | 11/1998 | Ueda et al. ............... 375/240.12 |
| 6,470,050 | B1 | * | 10/2002 | Ohtani et al. ............ 375/240.16 |
| 6,674,798 | B2 | * | 1/2004 | Ishihara et al. .......... 375/240.16 |
| 7,126,991 | B1 | * | 10/2006 | Mimar ..................... 375/240.16 |
| 8,107,748 | B2 | * | 1/2012 | Miao et al. .................... 382/236 |
| 8,126,052 | B2 | * | 2/2012 | Suzuki et al. ............. 375/240.12 |
| 8,208,541 | B2 | * | 6/2012 | Iguchi et al. ............. 375/240.12 |
| 8,634,471 | B2 | * | 1/2014 | Endo ......................... 375/240.16 |
| 2004/0184541 | A1 | * | 9/2004 | Brockmeyer et al. ..... 375/240.16 |
| 2005/0078749 | A1 | * | 4/2005 | Ju ............................. 375/240.12 |

(Continued)

FOREIGN PATENT DOCUMENTS

| JP | 8-79767 | 3/1996 |
| JP | 2005-354174 | 12/2005 |
| JP | 2007-43421 | 2/2007 |

OTHER PUBLICATIONS

International Search Report issued Aug. 3, 2010 in International (PCT) Application No. PCT/JP2010/003639.

(Continued)

*Primary Examiner* — William C Vaughn, Jr.
*Assistant Examiner* — Luis M Perez
(74) *Attorney, Agent, or Firm* — Wenderoth, Lind & Ponack, L.L.P.

(57) ABSTRACT

An image coding apparatus includes: a search range control unit which sets a search range that requires a small amount of data to be transferred; an obtaining unit which obtains data of pixels within the search range from an image memory storing the data; and a predicting unit which performs motion estimation.

16 Claims, 17 Drawing Sheets

(56) References Cited

U.S. PATENT DOCUMENTS

| | | | | |
|---|---|---|---|---|
| 2005/0226332 | A1* | 10/2005 | Uetani | 375/240.16 |
| 2005/0276328 | A1* | 12/2005 | Sakamoto | 375/240.16 |
| 2007/0030899 | A1 | 2/2007 | Iguchi et al. | |
| 2010/0098165 | A1* | 4/2010 | Farfade et al. | 375/240.16 |

OTHER PUBLICATIONS

MPEG-2 ISO/IEC13818-2 Standard in ITU-T H.262 Standard, Feb. 2000, Series H: Audiovisual and Multimedia Systems Infrastructure of audiovisual services—Coding of moving video, *"Information technology—Generic coding of moving pictures and associated audio information: Video"*.

H.264 ISO/IEC14496-10 Standard in ITU-T H.264 Standard, Mar. 2005, Series H: Audiovisual and Multimedia Systems Infrastructure of audiovisual services—Coding of moving video, *"Advanced video coding for generic audiovisual services"*.

\* cited by examiner

IMAGE CODING APPARATUS, METHOD, INTEGRATED CIRCUIT, AND PROGRAM

TECHNICAL FIELD

The present invention relates to image coding apparatuses and image coding methods in accordance with moving picture coding schemes using motion estimation between images.

BACKGROUND ART

Recent years have seen a widespread use of MPEG-2 (Moving Picture Expert Group-2) (Non patent Literature 1) and H.264 (Non patent Literature 2) as techniques for compressing and coding (hereinafter referred to as coding) moving picture data. In these image coding techniques, each of images (hereinafter referred to also as pictures) in a moving picture are subjected to motion estimation with reference to at least one picture that temporally precedes or succeeds the image. Furthermore, such coding involves coding of estimated motion information (including specifications of estimation-source pictures and motion vectors) and differences from the results of the estimation. In the coding, each picture is segmented into square or rectangle areas (hereinafter referred to blocks) each of which has a defined number of pixels and is used as a unit of coding.

FIG. 1 is a diagram showing general motion estimation.

A description is given of a method for estimating motion information performed in coding an image. In FIG. 1, 1001 denotes a current picture to be coded, 1002 denotes a block as a coding target (a current block to be coded), 1003 denotes an estimation-source picture, 1004 denotes a block co-located with a current block 1002 within the estimation-source picture 1003, 1005 denotes a search range, 1006 denotes a reference block, and 1007 denotes a motion vector.

Motion information is estimated in units of a block. First, the current block 1002 is determined, and then a picture that has already been coded and temporally precedes or succeeds the current block 1002 is determined as the estimation-source picture 1003. Next, within the estimation-source picture 1003, an area surrounding the block 1004 co-located with the current block 1002 is set as the search range 1005. Next, in the set search range 1005, blocks each having the same size as that of the current block 1002 is sequentially checked to find the block having the highest similarity with the current block 1002, and the block having the highest similarity is determined as the reference block 1006. Next, the relational position of the reference block 1006 with respect to the block 1004 co-located with the current block 1002 is shown using the motion vector 1007.

In FIG. 1, a hatched oval area in the picture 1001 in the right illustration shows an area of a subject (such as a car) captured in the picture 1001, etc. A hatched area in a picture 1003 in the left illustration shows, for example, an area of this subject in the picture 1003. As shown in the diagram, for example, the position of the hatched area in the left illustration may be different from the position in the right illustration due to, for example, movement of the car.

FIG. 2 is a diagram showing an example of a conventional image coding apparatus.

Various configurations have been disclosed as the configurations of image coding apparatuses which perform motion estimation (for example, Patent Literature 1). In FIG. 2, 2001 denotes a motion estimation unit, 2002 denotes an image memory, 2003 denotes a motion compensation unit, 2004 denotes an intra prediction unit, 2005 denotes a prediction scheme selecting unit, 2006 denotes a difference image generating unit, 2007 denotes an orthogonal transform and quantization unit, 2008 denotes a coding unit, 2009 denotes an inverse orthogonal transform and inverse quantization unit, 2010 denotes an image reconstructing unit, 2011 denotes a loop filter unit, 2012 denotes a block reading unit, 2013 denotes a similarity degree calculating unit, 2014 denotes an evaluating unit, and 2015 denotes a motion vector generating unit. Operations performed by an image coding apparatus 2x are described with reference to FIG. 2.

An input image is coded in units of a block. The current block (the current block 1002 (FIG. 1)) is input to the motion estimation unit 2001. The motion estimation unit 2001 sets a search range (search range 1005), based on the position information of the input current block, and sequentially reads images within the search range from the image memory 2002 and evaluates the read images to detect the block (reference block 1006) having the highest correlation with the current block. The image memory 2002 stores coded images. Next, the motion vector (motion vector 1007) indicating the relational position that is in the detected block and determined with respect to the current block is output to the motion compensation unit 2003.

The motion compensation unit 2003 reads the reference image indicated by the input motion vector from the image memory 2002 to obtain the reference image, and outputs the reference image as a prediction image for inter prediction to the prediction scheme selecting unit 2005.

In addition to this, the input image is input to the intra prediction unit 2004. The intra prediction unit 2004 generates an intra prediction image and an intra prediction information, and output them to the prediction scheme selecting unit 2005.

The prediction scheme selecting unit 2005 selects one of the intra prediction scheme and the inter prediction scheme, and outputs the prediction image for use in the selected one of the schemes to the difference image generating unit 2006.

The difference image generating unit 2006 generates a difference image between the input image and the prediction image for the selected one of the schemes output by the prediction scheme selecting unit 2005, and outputs the difference image to the orthogonal transform and quantization unit 2007.

The orthogonal transform and quantization unit 2007 outputs data obtained by performing orthogonal transform and quantization on the input difference image to each of the coding unit 2008 and the inverse orthogonal transform and inverse quantization unit 2009.

The coding unit 2008 performs variable length coding on the input data, and outputs the variable-length coded data as the coded image.

The inverse orthogonal transform and inverse quantization unit 2009 performs inverse quantization and inverse orthogonal transform on the data subjected to the orthogonal transform and quantization to generate a difference image, and outputs the difference image to the image reconstructing unit 2010.

The image reconstructing unit 2010 adds the prediction image generated by the prediction scheme selecting unit 2005 and the difference image generated by the inverse orthogonal transform and inverse quantization unit 2009 to generate a reconstructed image, and outputs the reconstructed image to the loop filter unit 2011.

The loop filter unit 2011 performs loop filtering on the reconstructed image, and stores the filtered reconstructed image to the image memory 2002.

The structure of the motion estimation unit 2001 is described.

The motion estimation unit 2001 (FIG. 2) includes a block reading unit 2012, a similarity degree calculating unit 2013, an evaluating unit 2014, and a motion vector generating unit 2015.

The block reading unit 2012 sets a search range (search range 1005) based on the position information of the current block, and sequentially reads the images within the set search range in the form of blocks from the image memory 2002. The read blocks are assumed to be candidate prediction images.

The block reading unit 2012 outputs, to the similarity degree calculating unit 2013, the image data of the candidate prediction images and the positions thereof within the picture.

The similarity degree calculating unit 2013 calculates the similarity degree between the current block and each of the image data of the candidate prediction images input by the block reading unit 2012, and outputs the similarity degree to the evaluating unit 2014.

The evaluating unit 2014 compares the calculated similarity degree of the block having the highest similarity degree and the calculated similarity degrees of the respective input candidate prediction image blocks within the search range. When the comparison of the similarity degrees are completed for all the blocks within the search range, the position of the block having the highest correlation within the search range is output to the motion vector generating unit 2015.

The motion vector generating unit 2015 generates a motion vector, based on the position information of the current block and the position information that is of the block having the highest correlation within the search range and input by the evaluating unit 2014, and outputs the motion vector to the motion compensation unit 2003.

FIG. 3 is a diagram showing a structure of a general moving picture decoding apparatus.

Next, how to decode a coded image is described. In the decoding, a prediction (see the earlier-mentioned prediction image) is generated (hereinafter, this generation processing is referred to as motion compensation), based on coded motion information and using the specified estimation-source picture (see the estimation-source picture 1003 in FIG. 1) and the motion vector (see the motion vector 1007). An image (see the block 1002 in FIG. 1) is reconstructed by adding the prediction and separately-coded difference information (see the earlier-mentioned difference image) indicating the difference from the prediction.

In FIG. 3, 3001 denotes a variable length decoding unit, 3002 denotes a motion compensation unit, 3003 denotes a motion vector calculating unit, 3004 denotes a reference image obtaining unit, 3005 denotes an image memory, 3006 denotes a prediction image generating unit, 3007 denotes an intra prediction unit, 3008 denotes a prediction scheme selecting unit, 3009 denotes an inverse quantization and inverse orthogonal transform unit, 3010 denotes an image reconstructing unit, and 3011 denotes a loop filter unit.

Operations performed by an image decoding apparatus are described with reference to FIG. 3.

A coded image input to the moving picture decoding apparatus 3x (image decoding apparatus) is input to the variable length decoding unit 3001 (as for the coded image, see the earlier description of the coded image output by the coding unit 2008 of the image coding apparatus 2x).

The variable length decoding unit 3001 performs variable length decoding. Next, the variable length decoding unit 3001 outputs information required to calculate a motion vector from among the results of the decoding to the motion compensation unit 3002, outputs information required for intra prediction to the intra prediction unit 3007, and outputs data required to generate a difference image to the inverse quantization and inverse orthogonal transform unit 3009.

The motion compensation unit 3002 performs inter prediction to generate a prediction image.

The motion compensation unit 3002 further includes a motion vector calculating unit 3003, a reference image obtaining unit 3004, and a prediction image generating unit 3006.

The information output from the variable length decoding unit 3001 and input to the motion compensation unit 3002 is next input to the motion vector calculating unit 3003.

The motion vector calculating unit 3003 calculates a motion vector, and outputs the motion vector to the reference image obtaining unit 3004.

The reference image obtaining unit 3004 obtains, as a reference image, a square or rectangle area indicated by the motion vector (see the reference block 1006 shown by the motion vector 1007 in FIG. 1) In a decoded image, and outputs the reference image to the prediction image generating unit 3006.

The prediction image generating unit 3006 generates a prediction image from the input reference image, and outputs the prediction image to the prediction scheme selecting unit 3008.

The intra prediction unit 3007 performs intra prediction using the information required for the intra prediction output by the variable length decoding unit 3001, and outputs the prediction image to the prediction scheme selecting unit 3008.

The prediction scheme selecting unit 3008 selects one of the image obtained using the inter prediction scheme and output by the motion compensation unit 3002 and the image obtained using the intra prediction scheme and output by the intra prediction unit 3007, and outputs, to the image reconstructing unit 3010, the image obtained, as the prediction image to be used, using the selected one of the prediction schemes.

The inverse quantization and inverse orthogonal transform unit 3009 performs inverse orthogonal transform and inverse quantization on the data output by the variable length decoding unit 3001 to generate a difference image, and outputs the difference image to the image reconstructing unit 3010.

The image reconstructing unit 3010 generates a reconstructed image by adding the prediction image output by the prediction scheme selecting unit 3008 and the difference image output by the inverse quantization and inverse orthogonal transform unit 3009, and outputs the generated reconstructed image to the loop filter unit 3011.

The loop filter unit 3011 performs loop filtering on the input image, and outputs the filtered image as a decoded image. In addition, the loop filter unit 3011 stores the output image into the image memory 3005 so that the image is used as a reference image in decoding of the following pictures.

CITATION LIST

Patent Literature

[PTL 1]
Japanese Laid-open Patent Application Publication No. 8-79767

Non Patent Literature

[NPL 1]
MPEG-2 ISO/IEC13818-2 Standard in ITU-T H.262 Standard

[NPL 2]
H.264 ISO/IEC14496-10 Standard in ITU-T H.264 Standard

SUMMARY OF INVENTION

Technical Problem

Such a general image memory (the image memory 3005) in a conventional image decoding apparatus (moving picture decoding apparatus 3x) is required to have a high data transfer capability. For this reason, memories generally used as such memories having an enhanced data transfer capability apply an approach for increasing a bit width and/or an approach called burst transfer intended to transfer serial data at high speed. The length of serial data transferred in such burst transfer is referred to as "burst length".

In the case of such a memory, the minimum data amount by which data can be read by one-time access (hereinafter referred to as a memory access unit) is determined based on the bit width of the memory and the burst length. In the case of a generally-used memory for a 16-bit (=2 bytes) width and a burst length of 4, the memory access unit is 8 bytes obtained by multiplying 2 by 4. Accordingly, in the case of using this memory as the image memory for the image decoding apparatus, data transfer in motion compensation is performed in units of a segment having a to-be-obtained size corresponding to a multiple of 8 from a corresponding starting point located at an 8-byte interval in the coordinate.

In H.264, the unit(s) of motion estimation performed by an image coding apparatus can be selected from the following seven kinds of block sizes: 16×16, 16×8, 8×16, 8×8, 8×4, 4×8, and 4×4. Here is a case of performing motion estimation using a small block size such as a unit of 4×4. In the following motion compensation performed by the image decoding apparatus, the amount of data transferred from the image memory significantly increases because the data is transferred from the image memory according to the memory access unit.

FIG. 4 is a diagram showing an example of data transfer in motion compensation performed by an image decoding apparatus.

In FIG. 4, the unit of motion estimation is 4×4 (a square area 4002), and a memory for a 16-bit width and a burst length of 4 is used as such an image memory. In addition, the pixels making up the image is assumed to be represented using 1-byte data.

In FIG. 4, 4001 denotes an image memory for 16×16 pixels (part of the earlier-mentioned image memory 3005), 4002 denotes a square area (4×4 pixels) required for motion compensation, and 4003 denotes the minimum data transfer area required to transfer the square area 4002 according to the 8-byte memory access unit.

The position of the reference image (reference block 1006) shown by the motion vector (see motion vector 1007 in FIG. 1) output by the conventional motion estimation unit (the motion estimation unit 2001 of the image coding apparatus 2x) is represented as (7, 7) that is the position of the left-top pixel 4002a in the square area 4002. However, the starting points in the coordinate in the horizontal direction (direction x in FIG. 4) are represented as multiples of 8 (8×n=8, 16, . . . ), and thus the position of the left-top pixel 4003a in the access area 4003 is represented as (0, 7). In addition, while the horizontal size 4S1 of the square area 4002 corresponds to 4 pixels, the to-be-obtained size (to-be-obtained size 4S2) in the horizontal direction is a multiple of 8, and thus the to-be-obtained size 4S2 of the access area 4003 corresponds to 16 pixels. In this way, in order to access the square area of 4×4 pixels (size 4S1), the block 4003 of 16×4 pixels (to-be-obtained size 4S2) must be obtained.

In other words, a motion estimation unit (motion estimation unit 2001) in a conventionally-structured image coding apparatus produces a problem of decreasing efficiency in subsequent processing that is motion compensation performed in a general image decoding apparatus because, in the motion compensation, unnecessary data 4rD (data in the area marked with vertical hatching lines) that is data of pixels other than the pixels required as a reference image is transferred based on a motion vector output by the motion estimation unit.

The present invention is intended to solve the aforementioned conventional problems, and aims to provide image coding apparatuses configured to generate coded images that require a reduced amount of reference image data to be transferred in motion compensation performed by image decoding apparatuses.

Solution to Problem

In order to solve the above-described conventional problem, an image coding apparatus according to the present invention is intended to code a current image using motion estimation, and the image coding apparatus includes: a search range control unit configured to set, as a search range for use in motion estimation, a search range (first search range) that requires a transfer amount (first transfer amount) smaller than a first threshold value (a later-described second transfer amount, etc.), the transfer amount being an amount of data to be transferred for use in motion compensation in decoding the coded image; an obtaining unit (see the determining unit 5003bx in FIG. 16) configured to obtain, in the motion estimation, pixel data (first pixel data that requires the first transfer amount) of pixels within the set search range (for the smaller first transfer amount) from an image storage unit configured to store a reference image including the pixels having the pixel data (in other words, this obtaining unit does not obtain second pixel data that requires the second transfer amount); and a motion estimation unit (see the prediction processing unit 2015x in FIG. 16) configured to perform the motion estimation using the obtained pixel data (first pixel data) and pixel data of current pixels to be coded.

In this way, in the motion compensation in decoding the coded image generated by the image coding apparatus, the search area selecting unit limits the search ranges for motion estimation to search only areas that do not increase the transfer amount of images required for the motion compensation, and thereby making it possible to reduce the transfer amount of a reference image in the motion compensation in decoding the coded image.

For example, a determination is made to find the pixel data is one of the first pixel data that requires the small first transfer amount and the second pixel data that requires the large second transfer amount. More specifically, as described above, this determination is made after an appropriate search range (first search range) is set to make this determination. Here, only (the data determined to be) the first pixel data is obtained and used in motion estimation and (the data determined to be) the second pixel data is neither obtained nor used. Thus, only the transfer requiring the first transfer amount is necessary, and the transfer requiring the second transfer amount is unnecessary. Therefore, the transfer amount can be reduced.

In addition, the search range control unit may be configured to set, as the search range in the motion estimation, one of a first search range and a second search range which has been specified as setting from outside the search range control unit, and to set the second search range in the case where the second search range is specified, the first search range requiring a transfer in a first transfer amount that is smaller than a second transfer amount (for example, equal to the aforementioned threshold value), and the second search range requiring a transfer in the second transfer amount that is larger than the first transfer amount.

In this way, it is also good to set the search range specified by setting from outside from among plural search ranges.

In this way, it is possible to control from outside the transfer amount of a reference image in motion compensation in decoding the coded image.

In other words, for example, it is also good to set the first search range that requires the small first transfer amount, and switch from the second search range that requires the large second transfer amount to the first search range that requires the small first transfer amount according to the setting from the outside.

In this way, the second search range is set, before the switching, to prevent negative effects such as decrease in coding efficiency caused when the first search range is set, and the switching is made to the first search range to reduce the transfer amount after the switching. This makes it possible to achieve a small transfer amount and a high coding efficiency, etc.

In addition, the search range control unit may be configured, when setting the search range for the motion estimation, to set, the first search range (see 8013*x*) that requires a transfer in a first transfer amount calculated for the motion compensation in the decoding only when the amount of data to be transferred (see S12004) is larger than the second threshold value (see S12005: Yes), and set the second search range that requires a transfer in a second transfer amount when the amount of data to be transferred is smaller than the second threshold value (see S12005: No).

In this way, not only the first search range but also the second search range are appropriately set. In this way, it is possible to reduce the influence of decrease in coding efficiency caused by setting the first search range with an aim to reduce the transfer amount of a reference image in motion compensation in decoding the current image.

In addition, the search range control unit may be configured to calculate the amount of data to be transferred for use in the motion compensation in the decoding, based on specifications of an access unit used by a decoder-side image storage unit configured to store the reference image in the decoding and a position of the reference image.

It is to be noted that the aforementioned position is, for example, the storage position of the reference image in the storage area in the decoder-side image storage unit.

In this way, appropriate processing is performed based on the specifications of the image decoding apparatuses selected from among the image decoding apparatuses each including an image memory having specifications different from the image memories of the other image decoding apparatuses, irrespective of which one of the image decoding apparatuses is selected and used. Such appropriate processing makes it possible to reduce the transfer amount of a reference image in motion compensation more reliably.

Furthermore, another image coding apparatus according to the present invention is intended to code a current image using motion estimation, and the image coding apparatus includes: an obtaining unit (see the determining unit 5003 *bx* in FIG. 17) configured to obtain, in the motion estimation, pixel data of pixels within a search range for use in the motion estimation, from an image storage unit configured to store a reference image including the pixels having the pixel data; a data transfer amount calculating unit (see the prediction processing unit 2015*x* in FIG. 17) configured, in the case where the obtained pixel data is determined as a prediction image that is used to generate a difference image in the coding of the current image, to calculate a transfer amount of data to be transferred for use in motion compensation in decoding the coded image obtained using the pixel data as the prediction image; and a motion estimation unit configured to perform the motion estimation, using the calculated transfer amount, the obtained pixel data, and pixel data of current pixels to be coded.

In this way, it is possible to reduce the data amount of a reference image for use in motion compensation in decoding and transferred from the image memory while dynamically prioritizing either coding efficiency or reduction in the amount of data transferred from a memory in decoding, without limiting the search ranges.

In other words, for example, pixel data for which the small first transfer amount is calculated is determined to be the first pixel data whereas pixel data for which the large second transfer amount is calculated is determined to be the second pixel data. It is possible to reduce the transfer amount because only (the data determined to be) the first pixel data is used and (the data determined to be) the second pixel data is not used.

In addition, the data transfer amount calculating unit may be configured to calculate the transfer amount, based on specifications of an access unit used by a decoder-side storage unit configured to store the reference image in the decoding and a position of the reference image (the position is storage position in the storage area in the decoder-side storage unit).

In this way, appropriate processing is performed based on the specifications of the image decoding apparatus selected from among the image decoding apparatuses each including an image memory having specifications different from the image memories of the other image decoding apparatuses, irrespective of which one of the image decoding apparatuses is selected and used. This appropriate processing makes it possible to reduce the transfer amount of a reference image in motion compensation more reliably.

In this way, for example, it is possible to reduce the transfer amount by transferring only the small first transfer amount and not transferring the large second transfer amount, using image coding apparatuses ((the first image coding apparatus (see FIG. 16) and a second image coding apparatus (see FIG. 17)) each configured to include a determining unit (see determining unit 5003*bx* (see FIG. 16 and FIG. 17) and a prediction unit (prediction processing unit 2015*x* (FIG. 16 and FIG. 17) which performs processing corresponding to the result of determination made by the determining unit.

In this way, with the determining unit and the prediction processing unit, the aforementioned problem of undesirable transfer amount increase due to unnecessary transfer is solved. Therefore, the problem is solved by each of the aforementioned first and second image decoding apparatuses.

Advantageous Effects of Invention

With an image coding apparatus according to the present invention, it is possible to reduce the amount of reference image data to be transferred in motion compensation in decoding an coded image, and thereby reducing the cost required for an external memory for the image decoding apparatus.

DESCRIPTION OF EMBODIMENTS

Embodiments will be described below with reference to the drawings.

Detailed descriptions are given of exemplary embodiments in the present invention using the drawings.

Figure 8:
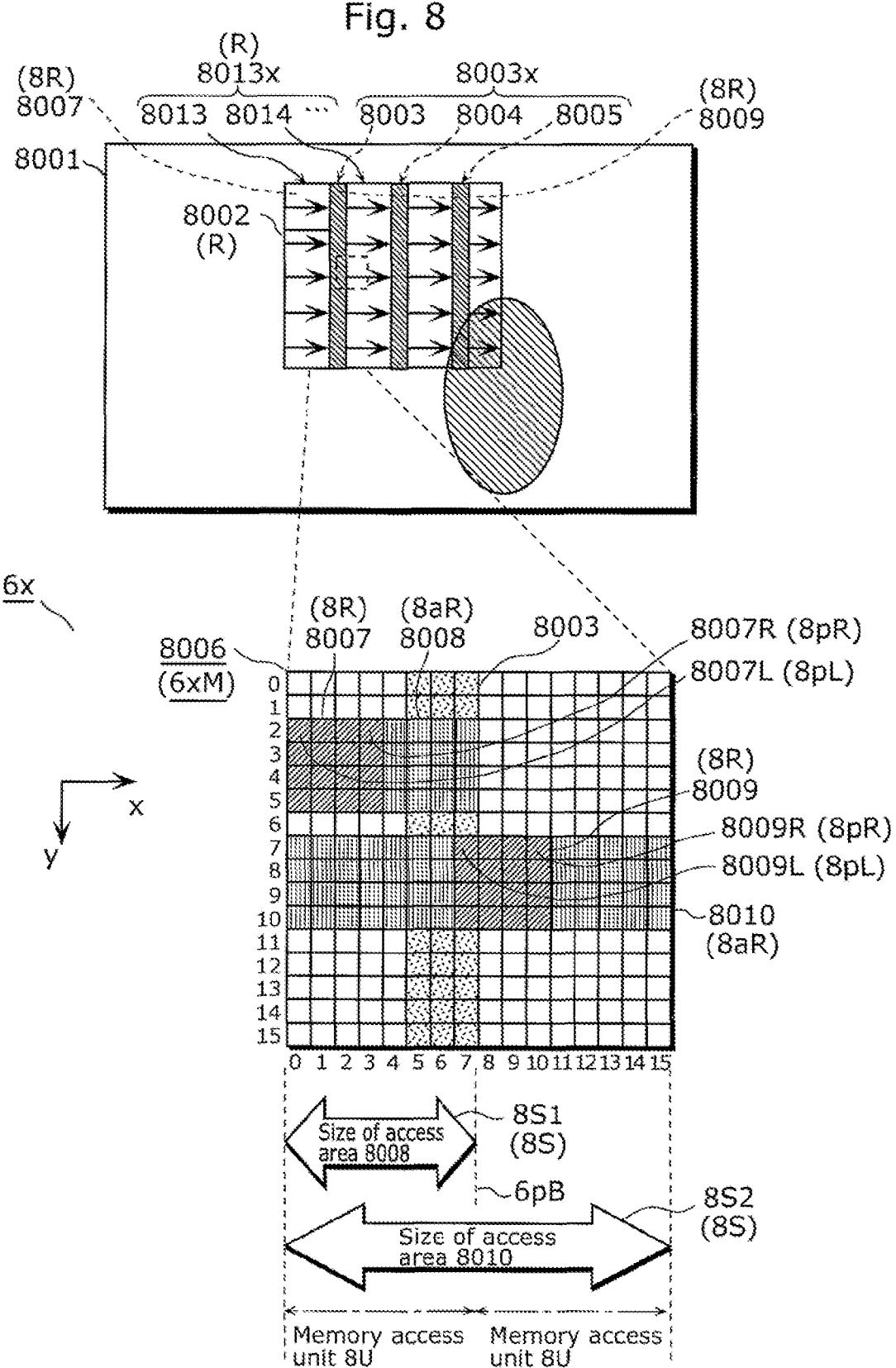
FIG. 8 is a diagram showing a search range in the case of a decoding-time memory transfer amount reduction mode according to Embodiment 1 of the present invention.
Figure 16:
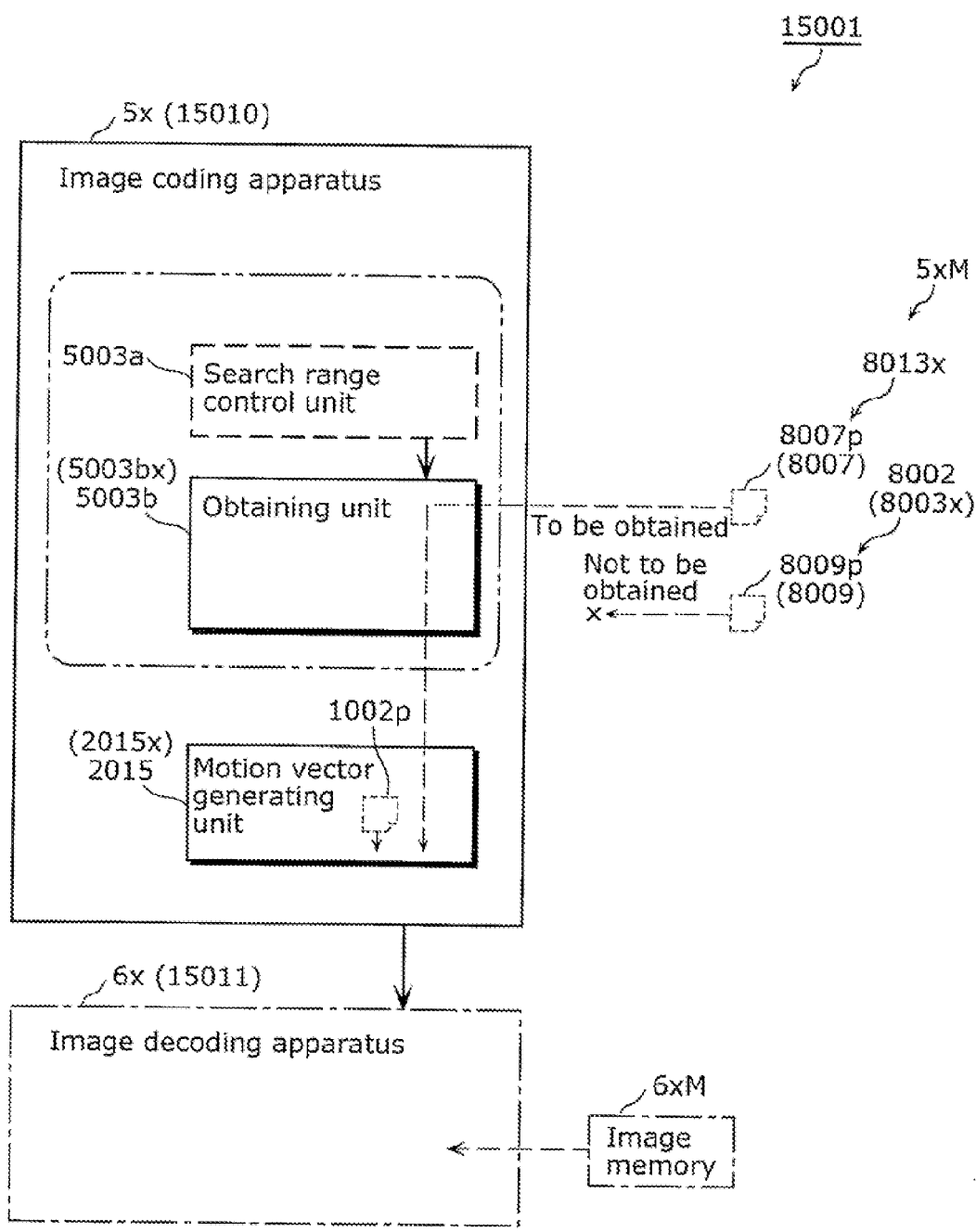
FIG. 16 is a diagram showing an image coding apparatus and an image decoding apparatus.

An image coding apparatus according to Embodiment 1 is an image coding apparatus $5x$ (FIG. 5, FIG. 16, etc.) intended to code a current image (see a current picture 1001 in FIG. 1) using motion estimation, and the image coding apparatus $5x$ includes: a search range control unit (search range control unit $5003a$ in FIG. 16) configured to set, as a search range for use in motion estimation (a second search range 8002, a first search range $8013x$ shown in FIG. 8), a search range (the first search range $8013x$) that requires a transfer amount (the first transfer amount in the first size 8S1) smaller than a first threshold value (for example, the transfer amount in the second size 8S2 in FIG. 8), the transfer amount being an amount of data to be transferred for use in motion compensation in decoding the coded image (the current image 1001); an obtaining unit (obtaining unit $5003b$) configured to obtain, in the motion estimation, pixel data (the first pixel data $8007p$; FIG. 16) of pixels within the set search range (the first search range $8013x$) from an image storage unit (image memory 2002 ($5x$M)) configured to store a reference image (a first block 8007, a reference picture 8001) including the pixels having the pixel data; and a motion estimation unit (prediction processing unit $2015x$) configured to perform the motion estimation using the obtained pixel data (the first pixel data $8007p$) and pixel data (pixel data $1002p$) of current pixels to be coded.

In other words, for example, the obtaining unit may be configured to determine whether the pixel data (see the block 8R) is the first pixel data (the first block 8007) in the set search range (see the first search range $1013x$ in FIG. 8) or the second pixel data (the second block 8009 in the second search range that requires a transfer in the second transfer amount larger than the first transfer amount required in the first search range (the second transfer amount is the threshold value, and the transfer in the second transfer amount is, for example, a transfer in a size 8S2 larger than the size 8S1).

It is possible for the obtaining unit to obtain only (the data determined to be) the first pixel data in the first search range and not to obtain (the data determined to be) the second pixel data.

It is possible for the motion estimation unit to use only the obtained first pixel data and not to use the second pixel data, thereby requiring only the small first transfer amount without requiring the large second transfer amount.

In this way, it is possible to reduce the transfer amount because only the small first transfer amount is required.

In this way, it is good to provide a determining unit which makes such a determination (an obtaining unit (see the determining unit $5003bx$ in FIG. 16)) and a prediction processing unit which performs processing based on the result of the determination (motion estimation unit, prediction processing unit $2015x$).

In this way, the search range control unit sets the first search range that requires the small first transfer amount instead of setting the second search range that requires the second transfer amount that is larger than a threshold value, and thereby reducing the transfer amount.

It is possible to assume, when the first search range is set, a block within the first search range to be set is a first block, and a block outside the first range is the second block.

Furthermore, a second image coding apparatus according to Embodiment 2 is an image coding apparatus $10x$ (FIG. 13, FIG. 17) intended to code a current image using motion estimation, and the image coding apparatus $10x$ includes: an obtaining unit (a block reading unit 2012) configured to obtain, in the motion estimation, pixel data of pixels within a search range (see a search range R) for use in the motion estimation, from an image storage unit (an image memory 2002 ($5x$M)) configured to store a reference image (a block 8R, a reference picture 8001) including the pixels having the pixel data; a data transfer amount calculating unit (a decoding-time memory transfer amount calculating unit 13002) configured, in the case where the obtained pixel data is determined as a prediction image that is used to generate a difference image (see a difference image 2006 in FIG. 2) in the coding of the current image (see the prediction scheme selecting unit 2005 in FIG. 2), to calculate a transfer amount (for example, the amount in the size 8S1, the amount in the size 8S3, etc.) of data to be transferred for use in motion compensation in decoding the coded image (the current picture 1001) obtained using the pixel data as the prediction image; and a motion estimation unit (the prediction processing unit $2015x$) configured to perform the motion estimation, using the calculated transfer amount, the obtained pixel data, and pixel data of current pixels to be coded.

Figure 17:
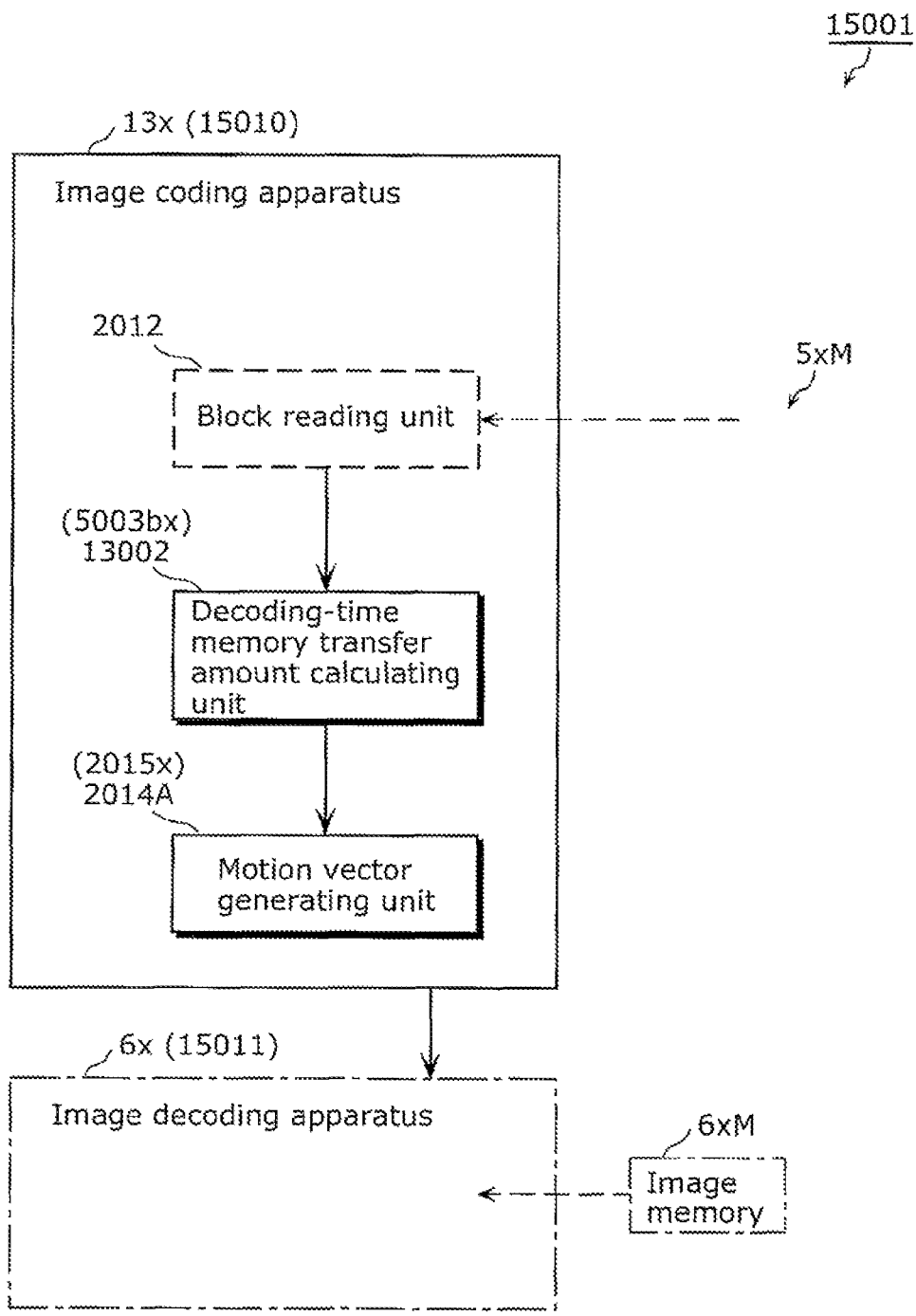
FIG. 17 is a diagram showing an image coding apparatus and the image decoding apparatus.

In other words, the data transfer amount calculating unit may calculate the data amount to determine pixel data (blocks) is the first pixel data (first block) having the small first transfer amount to be calculated or the second pixel data (second block) having the large second transfer amount to be calculated (determining unit 5003*bx* in FIG. 17).

The motion estimation unit may use only the first pixel data (first block) that requires the small first transfer amount and not to use the second pixel data (second block) that requires the large second transfer amount (the prediction processing unit 2015*x* in FIG. 17).

In this way, it is possible to reduce the transfer amount because only the small first transfer amount is required.

In this way, for example, it is possible for the image coding apparatuses (first and second image coding apparatuses) in embodiments to perform only coding with reference to the first block (block 8007) that requires the small first transfer amount (for example, transfer amount indicated as a size 8S1) and not to perform coding with reference to the second block (block 8009) that requires the large second transfer amount (transfer amount indicated as a size 8S2). This makes it possible to reduce the transfer amount in decoding because the transfer that requires the large second transfer amount (size 8S2) is prevented and only the transfer that requires the small first transfer amount (size 8S1) is performed.

Specifically, as a simple example, it is also good to reduce transfer amount in a situation and not to reduce transfer amount in another situation.

In this way, it is possible to reduce transfer amount using image coding apparatuses (the first image coding apparatus 5*x* (FIG. 16) and the second image coding apparatus 13*x* (FIG. 17)) each configured to include, for example, (i) a determining unit (an obtaining unit which obtains the first pixel data in the first search range (the determining unit 5003*bx* in FIG. 16)), (ii) a data transfer amount calculating unit (the determining unit 5003*bx* in FIG. 17) which calculates a transfer amount, and (iii) a coding processing unit (motion estimation unit: the prediction processing unit 2015*x* (FIG. 16, FIG. 17) which performs processing according to the result of the determination.

In this way, for example, the same problem as the problem that is solved by the aforementioned first image coding apparatus is solved by also the second image coding apparatus.

In this way, the technique according to the present invention may produce an advantageous effect that is obtainable because only the first block that requires the small first transfer amount is used and the second block that requires the large second transfer amount is not used. In contrast, the prior art fails to involve such an operation, and thus does not produce such an advantageous effect. This point differentiates the technique according to the present invention over the prior art.

More specifically, here is a case where a block 8R is referred to in decoding irrespective of the position of the block 8R (the left-top pixel 8*pL*) in the image memory 6*x*M (FIG. 8) that is either the second position (the left-top pixel 8009L) that requires the large second transfer amount or the first position (the left-top pixel 8007L) that requires the small first transfer amount. In this case, transfer that requires the large second transfer amount may be performed, resulting in an increase in transfer amount.

For this, the position of the block 8R in decoding that is either the first position (the left-top pixel 8007L in the first block 8007) or the second position (the left-top pixel 8009L in the second block 8009) may be determined (by the determining unit 5003*bx*).

It is also good (for the prediction processing unit 2015*x*) to refer to the block 8R only when the position is determined to be the first position, and not to refer to the block 8R when the position is determined to be the second block 8009.

By not performing transfer that requires the large second transfer amount in this way makes it possible to reduce the transfer amount.

It is to be noted that the first position may be the position at which the first access area 8008 is accessed using only a single access unit 8U (each having an 8-byte size, that is small in number) when reading the first block 8007 located at the first position.

The second position may be the position at which the second access area 8010 is accessed using two access units 8U (that is large in number).

It is also good to hold the information identifying the first position and the information identifying the second position (information of the search range 8013*x*), and make such a determination that the position is one of the first position and the second position the one of which is identified by the information.

For example, it is also good to perform transfer that requires the second transfer amount larger than the first transfer amount in the case where the second block 8009 is located at the second position different from the first position while the second block 8009 has the same size (4×4) as the size (4×4) of the first block 8007.

In other words, it is possible to avoid reference to the second block 8009 located at the second position that requires the large second transfer amount although the second block 8009 has a 4×4 size.

For example, it is also good that reference is made to only the first block that requires the first transfer amount smaller than the threshold value among the plural blocks having the identical size in a picture, and reference is not made to the second block that requires the second transfer amount equal to or larger than the threshold value.

Embodiment 1

Figure 2:
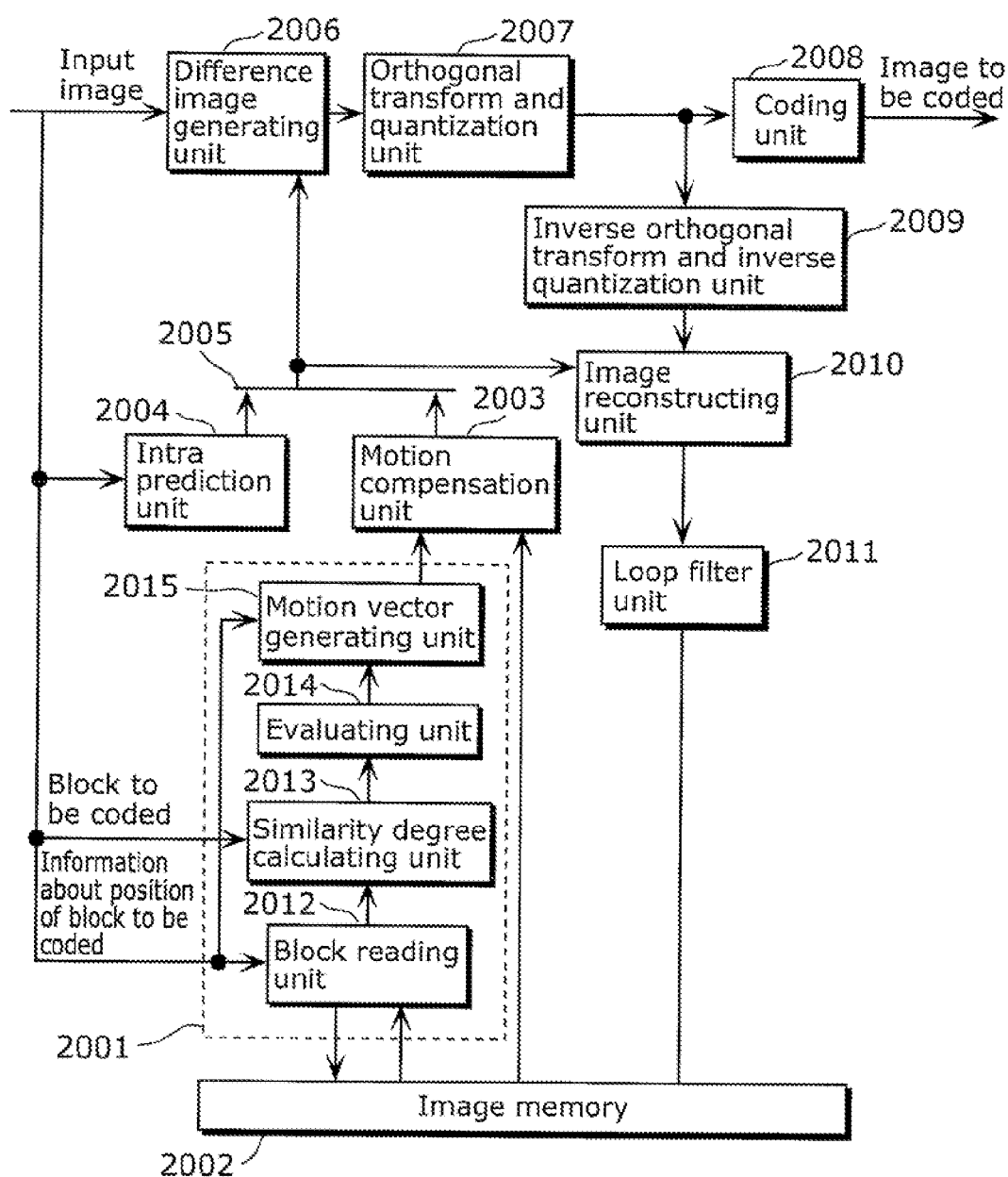
FIG. 2 is a diagram showing an example of a conventional image coding apparatus.
Figure 5:
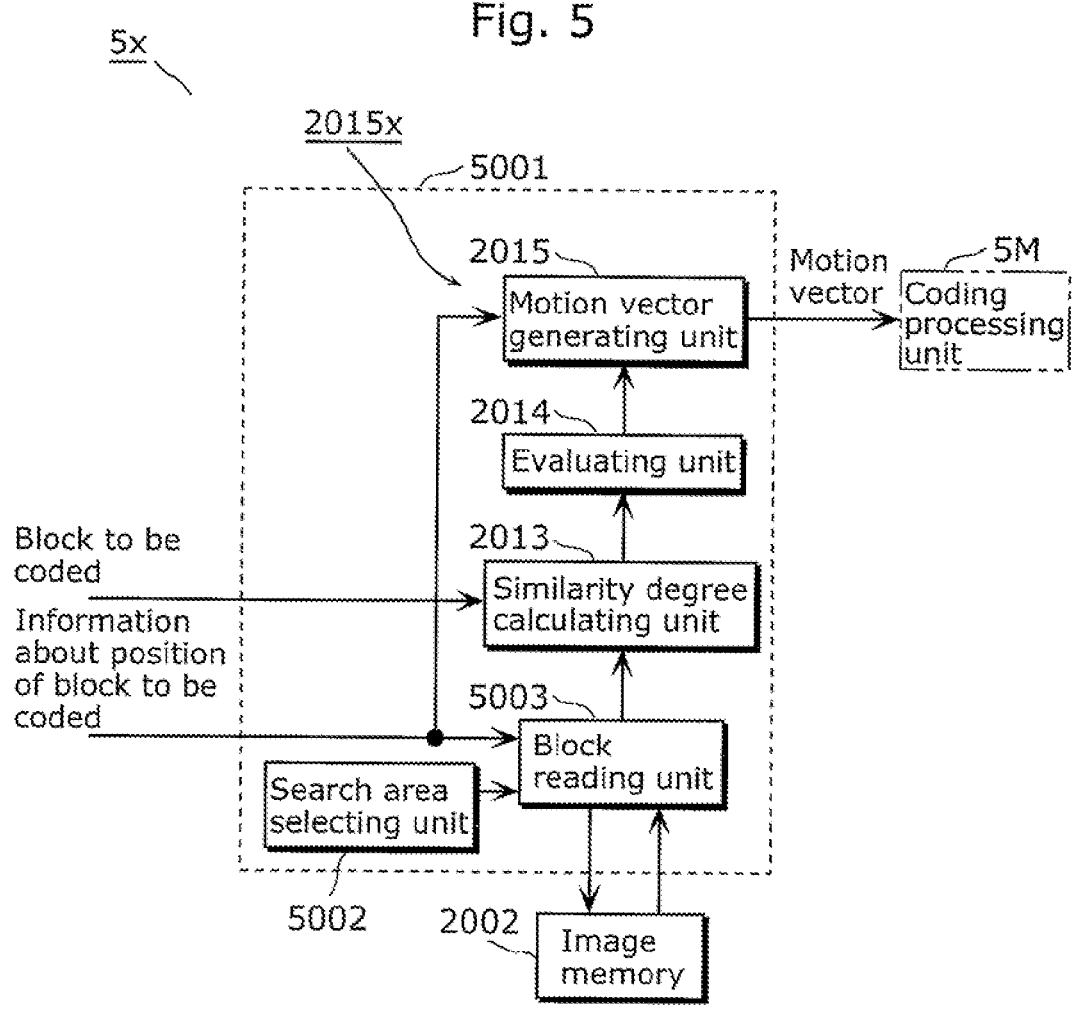
FIG. 5 is a diagram showing an example of an image coding apparatus according to Embodiment 1 of the present invention.

FIG. 5 is a structural diagram of a motion estimation unit 501 in an image coding apparatus 5*x* according to Embodiment 1 of the present invention. In FIG. 5, the same structural elements as in FIG. 2 are assigned with the same numerical references, and the descriptions thereof are skipped where appropriate.

As will be described in detail later, the image coding apparatus 5*x* may be, as a specific example, an image coding apparatus 15010 provided in a camcorder 15001 shown in FIG. 15.

In FIG. 5, 5001 denotes a motion estimation unit including a search area selecting unit 5002, an image memory 2002, a block reading unit 5003, a similarity degree calculating unit 2013, an evaluating unit 2014, and a motion vector generating unit 2015. Operations performed by the image coding apparatus 5*x* in Embodiment 1 are described below with reference to FIG. 5.

Figure 1:
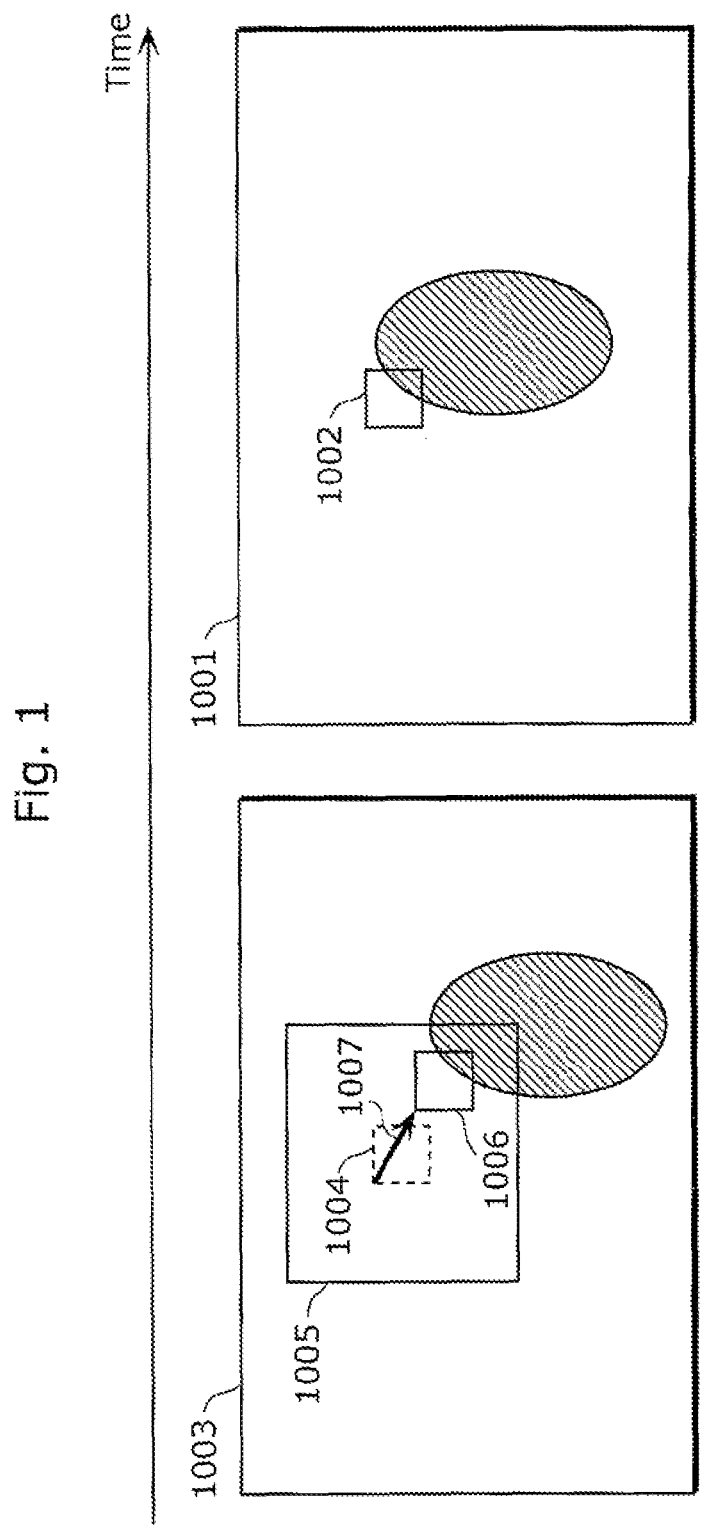
FIG. 1 is a diagram showing general motion estimation.

The motion estimation unit 5001 receives an, input of pixel data and position information of a current block to be coded (see a current block 1002 in FIG. 1).

The search area selecting unit 5002 outputs, to the block reading unit 5003, a mode signal for switching a search area for motion estimation that is set from outside (see a search range 8013*x* from which an exclusion area 8003*x* is excluded and a search range 8002 including the exclusion area 8003x shown in FIG. 8 as described later).

The block reading unit 5003 switches the search area, based on (the information, which is set from outside, of) the specifications of a memory for the image decoding apparatus 6x and according to the output mode signal for switching the search area, sequentially reads the blocks within the search area, and outputs the blocks to the similarity degree calculating unit 2013.

Next, a description is given of the mode signal for switching to the search area that is set for the search area selecting unit 5002. The search area selecting unit 5002 switches to one of two kinds of modes indicated below according to the setting from outside, and outputs the information indicating the switching-destination mode.

Coding efficiency priority mode

Decoding-time memory transfer amount reduction mode

Figure 6:
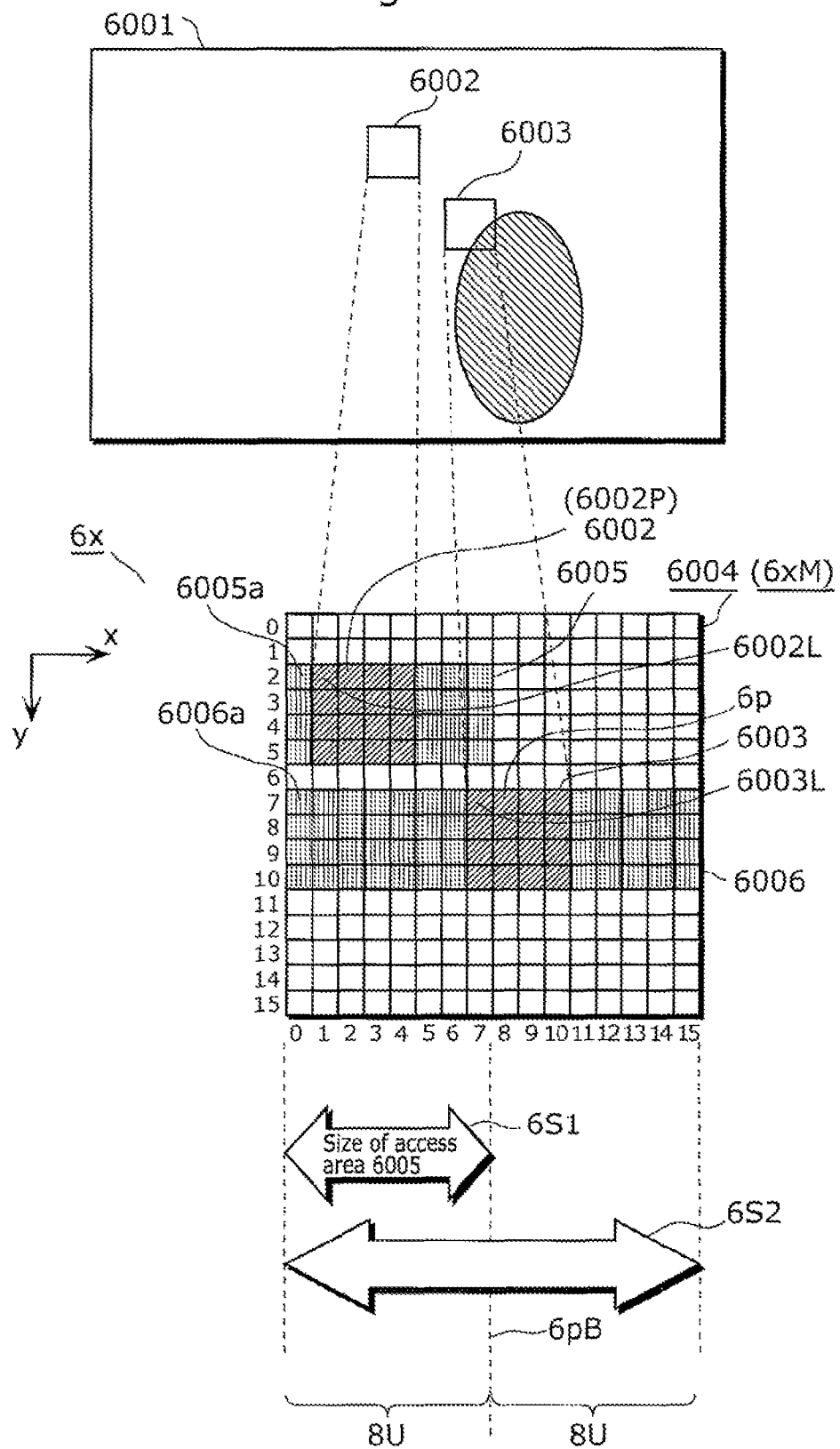
FIG. 6 is a diagram showing the amount of data to be transferred in motion compensation by an image decoding apparatus.

Before describing the two kinds of modes, a data transfer amount is described here with reference to FIG. 6. The data transfer amount is required in motion compensation performed by the image decoding apparatus 6x (FIG. 6, FIG. 8, etc. (for example, the image decoding apparatus 15011 in the camcorder 15001 in FIG. 15)) to decode a coded image generated by the image coding apparatus 5x.

FIG. 6 is a diagram showing the amount of data to be transferred in motion compensation by the image decoding apparatus 6x.

As will be described later, the image decoding apparatus 6x may be, as a specific example, the image decoding apparatus 15011 in FIG. 15.

In FIG. 6, it is assumed that a memory for a 16-bit width and a burst length of 4 is used as the image memory (image memory 6004), and the memory access unit is 8 bytes. In addition, the pixels making up the image is assumed to be represented using 1-byte data.

In FIG. 6, 6001 denotes a reference picture (see an estimation-source picture 1003 in FIG. 1), the blocks 6002 and 6003 are blocks (see blocks 1004, 1006 etc.) in a reference image. In addition, 6004 denotes an image memory for 16×16 pixels included in the image decoding apparatus 6x which decodes coded images generated by the image coding apparatus 5x.

The image memory 6004 may be, as a specific example, part of the image memory 6xM used for the image decoding apparatus 6x.

In addition, 6005 denotes an access area in the case of reading a reference image block 6002 according to the memory access unit, and 6006 denotes an access area in the case of reading a reference image block 6003 according to the memory access unit.

First, a description is given of a case of determining, as a reference image, the reference image block 6002 in motion estimation performed by the image coding apparatus 5x (FIG. 5). The left-top pixel 6002L in the reference image block 6002 is positioned at (1, 2), and the reference image block 6002 has a 4×4 size. Since the memory access unit for the image memory 6004 is 8 bytes here, the access area 6005 (size 6S1) is read out from the image memory 6004. The position of the left-top pixel 6005*a* in this access area 6005 is represented as (0, 2). In addition, the horizontal size 6S1 in the access area 6005 is 8 pixels.

Next, a description is given of a case of determining, as a reference image, the reference image block 6003 in motion estimation performed by the image coding apparatus 5x. The left-top pixel 6003L in the reference image block 6003 is positioned at (7, 7), and the reference image block 6003 has a 4×4 size. Since the memory access unit for the image memory 6004 is 8 byte's here, the access area 6006 is read out from the image memory 6004. The position of the left-top pixel 6006*a* in this access area 6006 is represented as (0, 7). The horizontal size 6S2 of the access area 6006 is 16 pixels obtained by multiplying 8 by 2. The reference image block 6003 includes a boundary 6*p*B corresponding to the line (the pixel 6*p*, represented as (8, 7)) that is horizontally distant by 8 pixels from the left-top pixel 6006*a* in the access area 6006.

In this way, the amounts of reference image data to be transferred from the image memory (image memory 6004 (image memory 6xM)) in motion compensation performed by the image decoding apparatus 6x can be calculated based on the position of the reference images (the blocks 6002 and 6003) (see the left-top pixels 6002L and 6003L) and the sizes (4×4, etc. as described above) of the reference images. As a feature, the position of a reference image is determined based on the value of a motion vector (see a motion vector 1007) that is calculated in motion estimation by the image coding apparatus 5x. The two kinds of modes utilize these features. The two kinds of modes are described in detail below.

Figure 7:
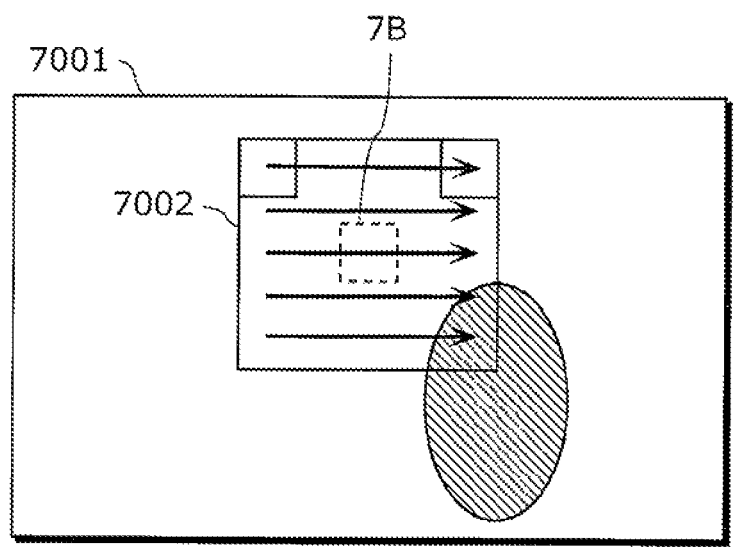
FIG. 7 is a diagram showing a search range in the case of a coding efficiency priority mode according to Embodiment 1 of the present invention.

FIG. 7 is a diagram showing a search range 7002 in the case of a coding efficiency priority mode according to Embodiment 1 of the present invention.

First, the coding efficiency priority mode is described.

The coding efficiency priority mode is for processing to find the reference image that yields the highest coding efficiency in motion estimation by the image coding apparatus 5x. In order to increase coding efficiency, it is a requisite to find reference image blocks (see blocks 1004, 1006) having high correlation with the current block (see the current block 1002 in FIG. 1). Accordingly, as shown in FIG. 7, the block reading unit 5003 (FIG. 5) reads all the blocks (see a block 7B) in a search range 7002 within a reference picture 7001. The similarity degree calculating unit 2013 calculates the similarity degrees between the current block and the respective blocks in the search range 7002, the next unit evaluates the calculated similarity degrees, and the still next unit selects, as a reference image, the block having the highest similarity degree, and generates a motion vector in the reference image. As will be described later, the search range 7002 may be, for example, a search range 8002 including an exclusion area 8003x shown in FIG. 8.

Next, a description is given of the decoding-time memory transfer amount reduction mode.

According to the decoding-time memory transfer amount reduction mode, based on (the information, which is set from outside, of) the specifications of the image memory (image memory 6004) in the image decoding apparatus 6x, the block reading unit 5003 limits the search ranges (see a search range 1005 in FIG. 1, a search range 7002 in FIG. 7, and a search range 8002 in FIG. 8) for motion estimation performed by the image coding apparatus 5x, so that the amount of reference image data to be transferred for motion compensation are small (see the access area 6005 that has a size 6S1 smaller than the size 6S2 of the access area 6006 and requires a comparatively small transfer amount). With reference to FIG. 8, more detailed descriptions are given of methods for calculating the amounts of reference image data to be transferred for motion compensation performed by the image decoding apparatus 6x and methods for limiting search ranges for motion estimation performed by the image coding apparatus 5x.

FIG. 8 is a diagram showing a search range (search range 8013x) in the case of the decoding-time memory transfer amount reduction mode in Embodiment 1 of the present invention.

In FIG. 8, 8001 denotes a reference picture (see the estimation-source picture 1003 in FIG. 1), 8002 denotes the search range in the coding efficiency priority mode (the search range 7002 in FIG. 7), each of 8003, 8004, and 8005 denotes a range not for search according to the decoding-time memory transfer amount reduction mode within the search range 8002. These areas 8003, 8004, and 8005 constitute an exclusion range 8003$x$.

In addition, 8006 denotes an image memory for 16×16 pixels included in the image decoding apparatus 6$x$ which decodes the coded images generated by the image coding apparatus 5$x$. Here, 8007 denotes an example of a candidate reference image block according to the decoding-time memory transfer amount reduction mode, and 8008 denotes an access area (area having a size 8S1) in the case of reading an exemplary reference image block 8007 according to the specifications of the memory. Here, 8009 denotes an example of a non-candidate reference image block according to the decoding-time memory transfer amount reduction mode, and 8010 denotes the access area (area having a size 8S2) in the case of reading the reference image block 8009 according to the specifications of the memory.

The image memory 8006 may be, as a specific example, part of the (earlier-mentioned) image memory 6$x$M used by the image decoding apparatus 6$x$, and may be the same as the image memory 6004 shown in FIG. 6.

The amount of reference image data for motion compensation are calculated based on (the information set from outside of) the specifications of the image memory for the image decoding apparatus 6$x$, the positions of the left-top pixels: (see the left-top pixel 6002L, 6003L in FIG. 6) in the reference blocks and the sizes of the reference blocks (such as 4×4 as mentioned earlier). In FIG. 8, it is assumed that the image memory 8006 is a memory for a 16-bit width and a burst length of 4, and the memory access unit is 8 bytes.

At this time, in the case where the left-top pixel (for example, the left-top pixel 8009L in the block 8009) of a reference image block having a 4×4 size is included in the area 8003 (see the upper and lower illustrations in FIG. 8), the area including the boundary between memory access units is accessed, resulting in an increase in the amount of reference image data to be transferred (see the block having a comparatively large size 8S2).

For example, the left-top pixel 8007L in the reference image block 8007 is positioned at (0, 0) in the access area 8008 to be accessed, and has a 4×4 size. Thus, the right-top pixel 8007R in the reference image block 8007 is positioned at (3, 0), and the reference image block 8007 has a size smaller than the 8-byte size that is the size of a memory access unit (see the boundary 6$p$B (in FIG. 8, FIG. 6). Accordingly, the access area 8008 has a comparatively small size of 8 bytes (8S1) in the horizontal direction (a direction x).

The left-top pixel 8009L in the reference image block 8009 is positioned at (7, 7), and the reference image block 8009 has a 4×4 size. Thus, the right-top pixel 8009R in the reference image block 8009 is positioned at (10, 7), and the reference image block 8009 has a size larger than the 8-byte size that corresponds to the size of a memory access unit (exceeds the boundary 6$p$B). Accordingly, the access area 8010 has a comparatively large horizontal size (8S2) corresponding to 16 bytes.

The memory access area (access areas 8008 and 8010 (access area 8$a$R)) has the comparatively large horizontal size (8S (8S1, 8S2) size in the direction x) corresponding to 16 bytes when the left-top pixel 8$p$L (the left-top pixel 8009L) in the block (block 8009) is present within the area 8003 (the exclusion area 8003$x$ (the upper illustration in FIG. 8)). In the case where the block (block 8009) that includes the left-top pixel 8$p$L and is included in the exclusion range 8003$x$ is used as a reference image, the access area 8$a$R (access area 8010) used in transfer has a comparatively large size (size 8S2) that would result in an increase in the reference image data transfer amount. In order to prevent such an increase, the block 8R (block 8009) that includes the left-top pixel 8$p$L (the left-top pixel 8009L) and is included in the area (the exclusion area 8003$x$) in the area 8003 is excluded from the search range for motion estimation. Likewise, the blocks in the areas 8004 and 8005 (in the illustration in FIG. 8) are excluded from the search range for motion estimation. In this way, it is possible to reduce the amounts of reference image data transferred from the memory in motion compensation.

Figure 9:
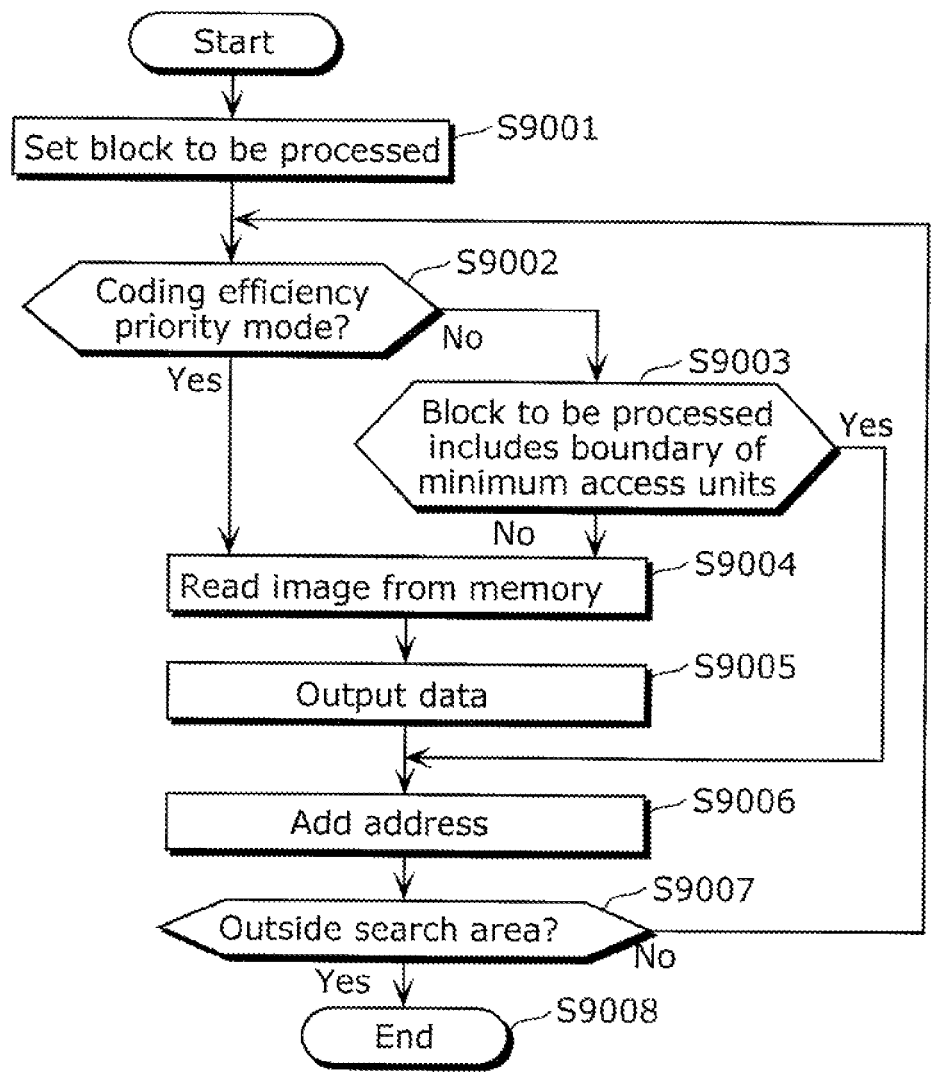
FIG. 9 is a flowchart of processing performed by a block reading unit according to Embodiment 1 of the present invention.

FIG. 9 is a flowchart of processing performed by the block reading unit 2012.

With reference to the flowchart of FIG. 9, a description is given of how to control the position of a block read by the block reading unit 5003 when data is input from the search area selecting unit 5002.

The block reading unit 2012 sets the search area (see the earlier-mentioned search range 8013$x$, 1005) based on the position information of the input current block to be coded (see the current block 1002 in FIG. 1) first, and determines the first block in the set search area to be the current block (block 8R in FIG. 8), and sets the position of the left-top pixel 8$p$L in the current block and the size of the current block (for example, 4×4) (Step S9001).

Next, a determination is made as to whether the mode input by the search area selecting unit 5002 is the coding efficiency priority mode or not (Step S9002).

In the case where the mode is the coding efficiency priority mode (Yes in Step S9002), Step S9004 is performed next to output, to the motion vector generating unit 2015, all the blocks within the block (the blocks include the blocks in the exclusion range 8003$x$ and are within the search range 8002).

On the other hand, in the case where the mode is the decoding-time memory transfer amount reduction mode (No in Step S9002), Step S9003 is performed next.

In Step S9003, whether the current block (block 8R) includes a boundary (boundary 6$p$B) between memory access units (corresponding to 8 bytes, for example) is determined based on the position of the left-top pixel 8$p$L in the current block (block 8R) and the size of the current block (4×4).

In the case where the current block does not include such a boundary (boundary 6$p$B) between memory access units (the block 8007, No in Step S9003), the current block (block 8007) is positioned at a position that requires a small transfer amount, and thus Step S9004 is performed next.

On the other hand, in the case where the current block (the block 8009) includes such a boundary between memory access units (the current block exceeds the boundary, Yes in Step S9003), the current block is positioned at a position that requires a large transfer amount, and thus the block at the position is not used for motion estimation. Thus, the current block is not read out from the image memory. Next, Step S9006 is performed.

In Step S9004, the image data positioned at the set address position (the data of the block 8007) is read out from the image memory 2002.

Next, the image data read out from the image memory 2002 is output to the motion vector generating unit 2015 (Step S9005).

This completes the process of reading a block. In order to change the current block to be read out (the aforementioned current block) to the next block, the address is added (Step S9006).

Next, whether the added address is within the earlier-mentioned set search range is determined (Step S9007). When the address is outside the search range (Yes in Step S9007), this sequential processing is completed. Otherwise, when the address is not outside the search range (No in Step S9007), S9002 is performed next and a series of processing is repeated.

It is to be noted that the above-described processing from S9002 to S9006 may be performed on, for example, each of the blocks within the set search range (the search range 8002 or 8013x) assuming these blocks to be the current block to be processed.

In this way, in the motion estimation performed by the image coding apparatus 5x, search is performed with restrictions on the positions of blocks within the search ranges (see the search range 8002 including the exclusion range 8003x). More specifically, for the search, the block reading unit (block reading unit 5003) which reads reference images from the image memory supports two kinds of modes, and the search area selecting unit (search area selecting unit 5002) switches between the modes (see the search range 8013x that does not include the exclusion range 8003x). In this way, in the motion estimation performed by the image coding apparatus 5x, it is possible to restrict search (the processes performed by the similarity degree calculating unit 2013 and the following units) within the range In which the amount of reference image data that is transferred for motion compensation in decoding does not increase (S9002 in FIG. 9: No). This makes it possible to reduce the amount of data to be transferred from the memory (image memory 6xM) connected to the image decoding apparatus 6x, and thereby reducing the cost.

In this embodiment, the memory (image memory 6xM) for the image decoding apparatus is assumed to be a memory for a 16-bit width and a burst length of 4, but the memory for use here is not limited thereto. For example, in the case of a memory for a 32-bit (=4 bytes) width and a burst length of 4, the memory access unit is 16 bytes obtained by multiplying 4 by 4. In the case of the decoding-time memory transfer amount reduction mode, the area that is excluded (see the exclusion area 8003x) from the search range is changed according to the specifications of the memory.

In this embodiment, methods for limiting search ranges in the motion estimation by the image coding apparatus have been described taking a case of using reference image blocks having a 4×4 size (for example, the block 8007 in FIG. 8). However, block sizes are not limited thereto. Likewise, search ranges for reference image blocks having other sizes are limited based on the number of memory access units required to transfer the reference image blocks.

In the descriptions, the pixels that constitute an image are assumed to be represented using 1-byte data. However, other sizes are possible as long as the search ranges are limited based on the number of access units required to transfer the reference image blocks.

In addition, in this embodiment, it has been assumed that all the blocks (see the block 7B) within the search range 7002 in the reference picture 7001 are read out according to the coding efficiency priority mode, and that the similarity degree calculating unit 2013 calculates the similarity degrees between the current block and the respective blocks in the search range 7002, and the next unit evaluates the calculated similarity degrees. However, this embodiment is not limited thereto. For example, it is possible to limit the number of blocks in the search range 7002 with an aim to reduce the number of blocks for which similarity degrees with the current block are calculated in order to reduce the operation amount in motion estimation in the image coding apparatus 5x.

In this embodiment, H.264 has been described as an image coding standard. However, image coding standards used here are not limited thereto, and other image coding standard such as MPEG-2 may be used.

The functional blocks of the image coding apparatus are typically achieved in the form of a program which functions on an information apparatus including a CPU (Central Processing Unit) and a memory. However, some or all of these functions may be achieved in the form of LSIs that are an integrated circuit. Each of these LSIs may be formed in a single chip, or some or all of these LSIs may be integrated into a single chip. The name used here is LSI, but it may also be called IC (Integrated Circuit), system LSI, super LSI, or ultra LSI depending on the degree of integration.

Moreover, ways to achieve integration are not limited to the LSI, and special circuit or general purpose processor and so forth may also achieve the integration. Field Programmable Gate Array (FPGA) that can be programmed after manufacturing LSI or a reconfigurable processor that allows re-configuration of the connection or configuration of LSI can be used for the same purpose.

Furthermore, advancement in semiconductor technology or emergence of derivative techniques may lead to a new integration technology that replaces LSI in the future. Naturally, such new technology may be used to integrate such functional blocks. For example, specifically, application of biotechnology is one such possibility.

Embodiment 2

As described above, the search area selecting unit 5002 in the image coding apparatus according to Embodiment 1 changes search ranges in motion estimation while switching between two kinds of modes that is set from outside (see search ranges 8002, 8013x). Setting the decoding-time memory transfer amount reduction mode makes it possible to reduce the data amount of reference images for use in motion compensation that are transferred from the image memory 2002 in decoding coded images.

However, search ranges in the case of the decoding-time memory transfer amount reduction mode are narrow (see the exclusion range 8003x) compared to the case of coding efficiency priority mode, and thus the coding efficiency may decrease.

To prevent this, there is a demand to achieve both a small transfer amount (the amount of data to be transferred) and a high coding efficiency by limiting the ranges using the decoding-time memory transfer amount reduction mode to a degree that allows controlling, within a certain range, the amounts of data transferred from the memory for motion compensation, and allows an increase in coding efficiency. An image coding apparatus according to Embodiment 2 of the present invention is intended to satisfy the demand.

Figure 10:
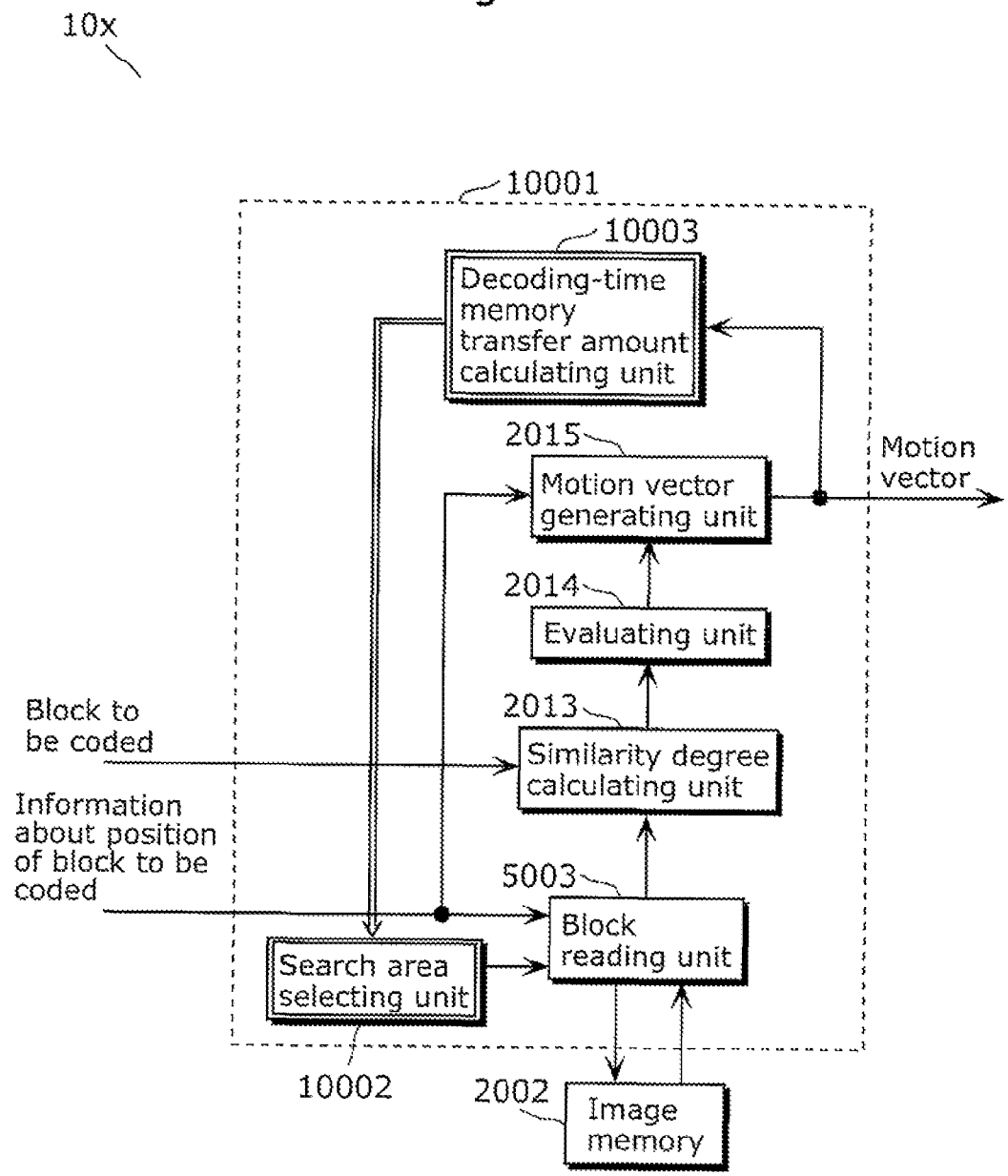
FIG. 10 is a diagram showing an example of an image coding apparatus according to Embodiment 2 of the present invention.

FIG. 10 is a diagram showing an image coding apparatus 10x.

The image coding apparatus (image coding apparatus 10x) according to Embodiment 2 in the present invention has a structure obtained by replacing the motion estimation unit 5001 in the structure in FIG. 5 with the motion estimation unit 10001 in FIG. 10. Compared to the motion estimation unit 5001 in FIG. 5, the motion estimation unit 10001 in FIG. 10 includes a search area selecting unit 10002 instead of the search area selecting unit 5002, and further includes a new unit that is a decoding-time memory transfer amount calculating unit 10003. In FIG. 10, the structural elements that operate in the same manner as in the structural diagram FIG.

5 referred to in Embodiment 1 are assigned with the same reference numerals, and the descriptions thereof are omitted where appropriate.

The search area selecting unit 10002 outputs, to the block reading unit 5003, the following two kinds of modes.

Coding efficiency priority mode

Decoding-time memory Transfer amount reduction mode

The coding efficiency priority mode is initially set at the start of coding. A switch between the coding efficiency priority mode and the decoding-time memory transfer amount reduction mode is made based on the amount of reference image data to be transferred in motion compensation in decoding. The transfer amount is input from the decoding-time memory transfer amount calculating unit 10003.

Figure 3:
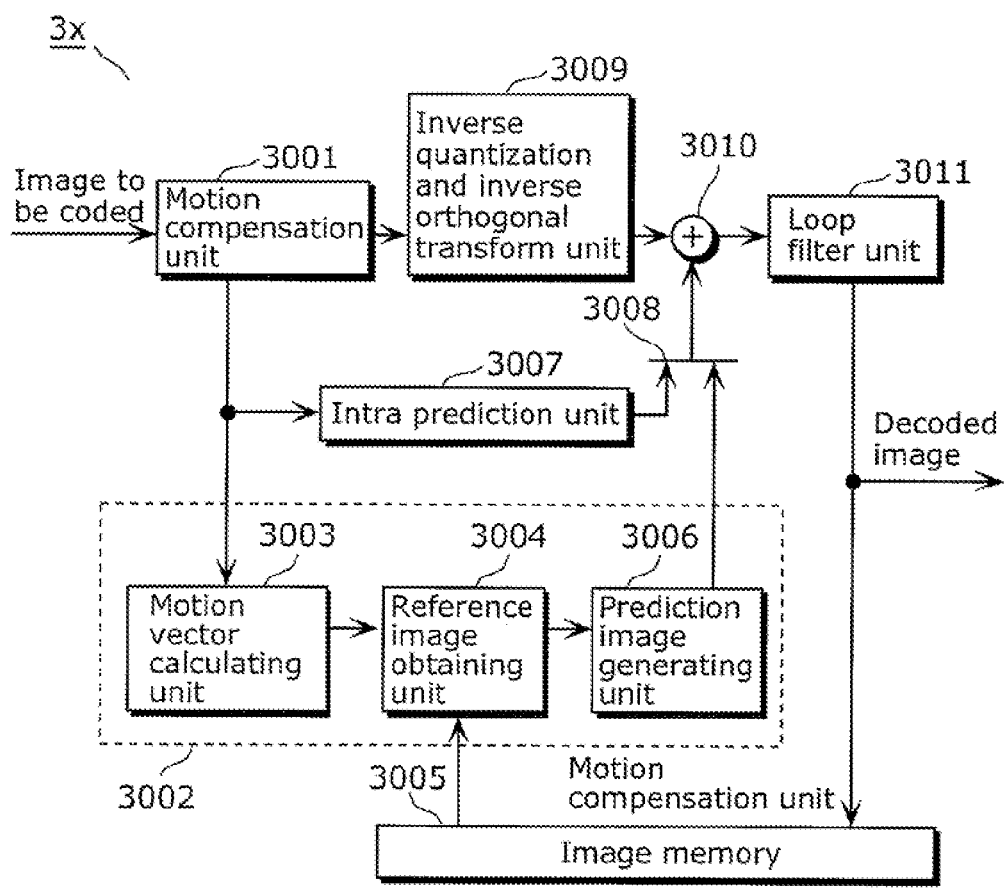
FIG. 3 is a diagram showing an example of a conventional image decoding apparatus.
Figure 4:
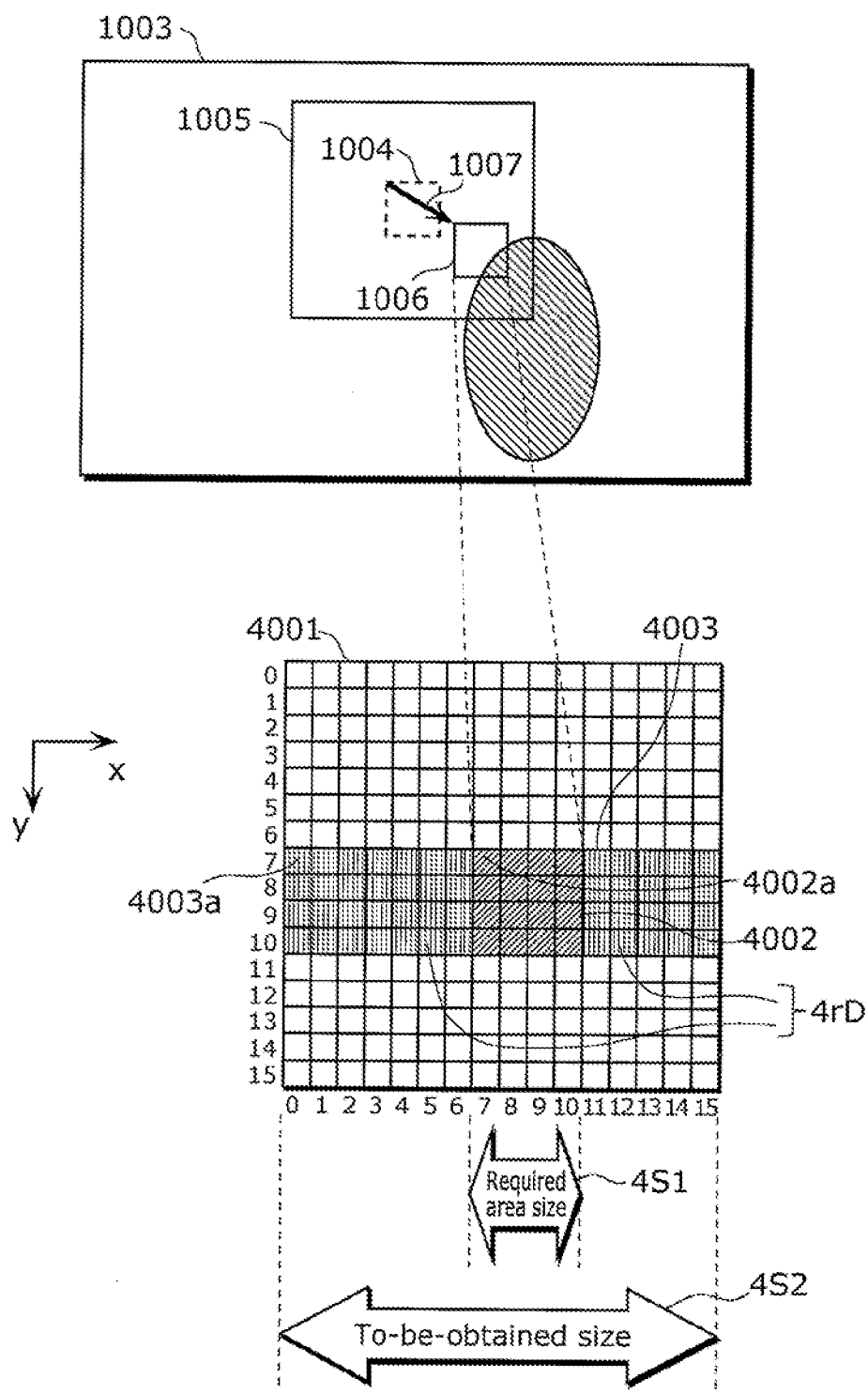
FIG. 4 is a diagram showing an example of data transfer in motion compensation performed by an image decoding apparatus.

The decoding-time memory transfer amount calculating unit 10003 receives an input of the value of a motion vector generated by the motion vector generating unit 2015. The amount of a reference image data that is transferred (hereinafter referred to as decoding-time memory transfer amount) in motion compensation when decoding a generated stream is calculated based on (the information, which is set from outside of) the specifications of the image memory (see the image memory 3005 in FIG. 3, the image memory 6xM in FIG. 6, etc.) in the image decoding apparatus and the reference image position specified by the input motion vector. The method for calculating the decoding-time memory transfer amount has been described in Embodiment 1 with reference to FIGS. 6 and 8, and thus the same descriptions are not repeated here.

More specifically, the decoding-time memory transfer amount calculating unit 10003 includes setting of, for example, a bit width and a burst length as the specifications of the memory, and calculates the decoding-time memory transfer amount using the memory access units determined based on these values. The decoding-time memory transfer amount for each calculated motion vector is output to the search area selecting unit 10002.

Figure 11:
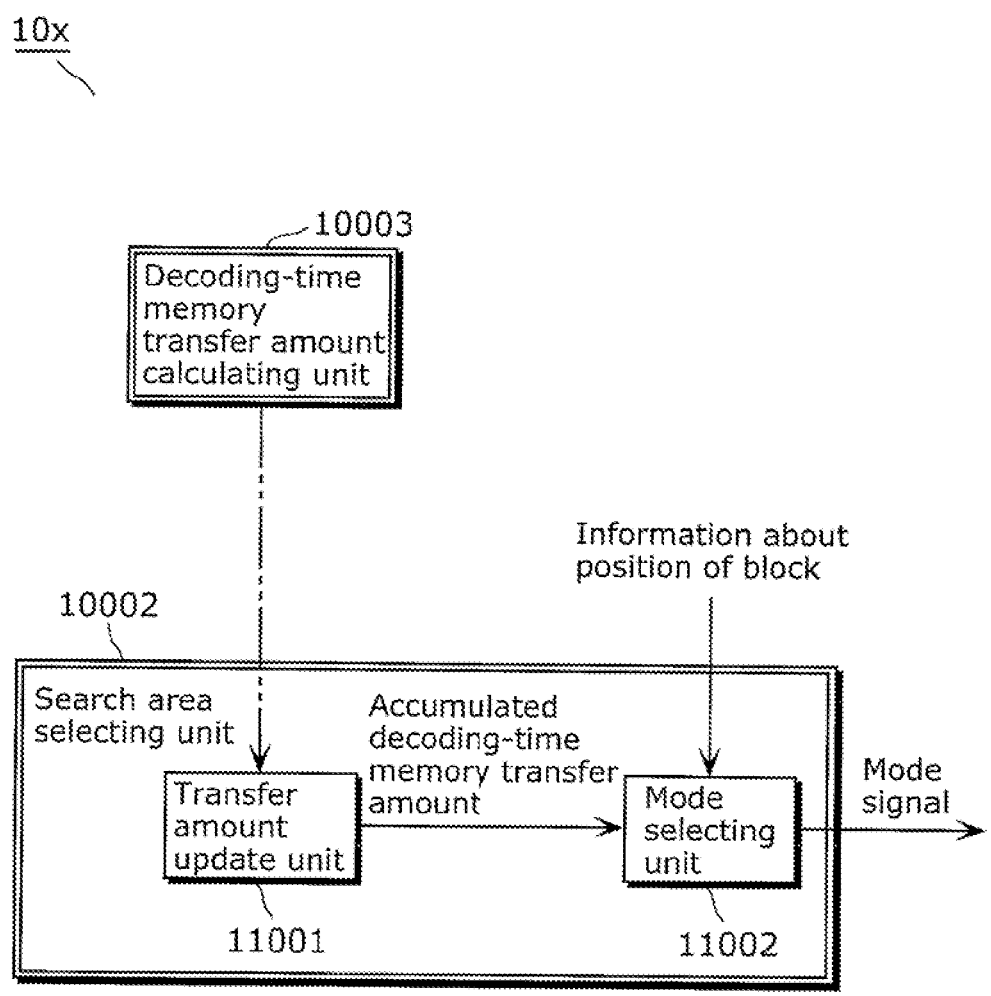
FIG. 11 is a diagram showing an example of a search area selecting unit according to Embodiment 2 of the present invention.

FIG. 11 is a structural diagram of the search area selecting unit 10002 (FIG. 10).

How the search area selecting unit 10002 switches modes is described with reference to FIG. 11. The search area selecting unit 10002 includes a transfer amount update unit 11001 and a mode selecting unit 11002.

The aforementioned value of the decoding-time memory transfer amount for each motion vector is output from the decoding-time memory transfer amount calculating unit 10003 to the search area selecting unit 10002, and is input to the transfer amount update unit 11001.

The transfer amount update unit 11001 calculates the value obtained by accumulating the decoding-time memory transfer amounts of the already coded blocks in a currently-being coded picture (the accumulated value is hereinafter referred to as accumulated decoding-time memory transfer amount). The calculated accumulated decoding-time memory transfer amount is output to the mode selecting unit 11002.

The following is a specific example of the method for calculating the decoding-time memory transfer amount of the currently-being coded picture. The transfer amount update unit 11001 initializes, to 0, the value of the transfer amount of the held reference image data when starting coding of the block that should be coded first in the picture. During the coding, the transfer amount update unit 11001 updates and holds the accumulated decoding-time memory transfer amount for the picture each time the value indicating the transfer amount per motion vector is input to the transfer amount update unit 11001.

The mode selecting unit 11002 selects one of the coding efficiency priority mode and the decoding-time memory transfer amount reduction mode, based on the accumulated decoding-time memory transfer amount and the position information of the currently-being coded block that have been input from the transfer amount update unit 11001. Next, the mode selecting unit 11002 outputs a mode signal indicating the selected one of the modes to the block reading unit 5003.

Next, a method of selecting one of the modes is described in detail. The mode selecting unit 11002 is provided with, as a threshold value, the reference image transfer amount (hereinafter, supposed decoding-time transfer amount) in motion compensation in decoding of a picture. The supposed decoding-time transfer amount is supposed for the image decoding apparatus (for example, the image decoding apparatus 6x) which decodes coded images, as the reference image transfer amount at the time of starting coding of the block that should be coded first in a picture. The supposed decoding-time transfer amount (threshold value) to be set is determined based on the specifications of the image memory in the image decoding apparatus and the size of a picture.

First, the mode selecting unit 11002 calculates the estimated transfer amount (hereinafter referred to as the estimated decoding-time transfer amount) of a reference image in motion compensation in decoding a currently-being coded picture. The mode selecting unit 11002 compares the value of the calculated estimated transfer amount with the (threshold) value of the earlier-mentioned supposed decoding-time transfer amount. When the value of the estimated decoding-time transfer amount exceeds the (threshold) value of the supposed decoding-time transfer amount, the mode selecting unit 11002 outputs a signal specifying the decoding-time memory transfer amount reduction mode. On the other hand, when the value of the estimated decoding-time transfer amount is below the (threshold) value of the supposed decoding-time transfer amount, the mode selecting unit 11002 outputs a signal specifying the coding efficiency priority mode.

Here is a description of an example of a method for calculating such an estimated decoding-time transfer amount. When the position information of a currently-being decoded block is input, the mode selecting unit 11002 (FIG. 11) calculates the number of coded blocks. The mode selecting unit 11002 calculates the decoding-time memory transfer amount per block (average amount) in each of the coded blocks by dividing the (earlier-mentioned) value obtained by accumulating the decoding-time memory transfer amounts of the coded blocks by the number of coded blocks. The mode selecting unit 11002 calculates the estimated decoding-time transfer amount by multiplying the decoding-time memory transfer amount (average amount) per block for each coded block by the total number of blocks in the currently-being coded picture. It is also possible to directly use, as the estimated decoding-time transfer amount, the earlier-mentioned average decoding-time memory transfer amount per block (average amount) when, for example, the supposed decoding-time transfer amount (threshold value) that is used together with the estimated decoding-time transfer amount is the amount per block.

Figure 12:
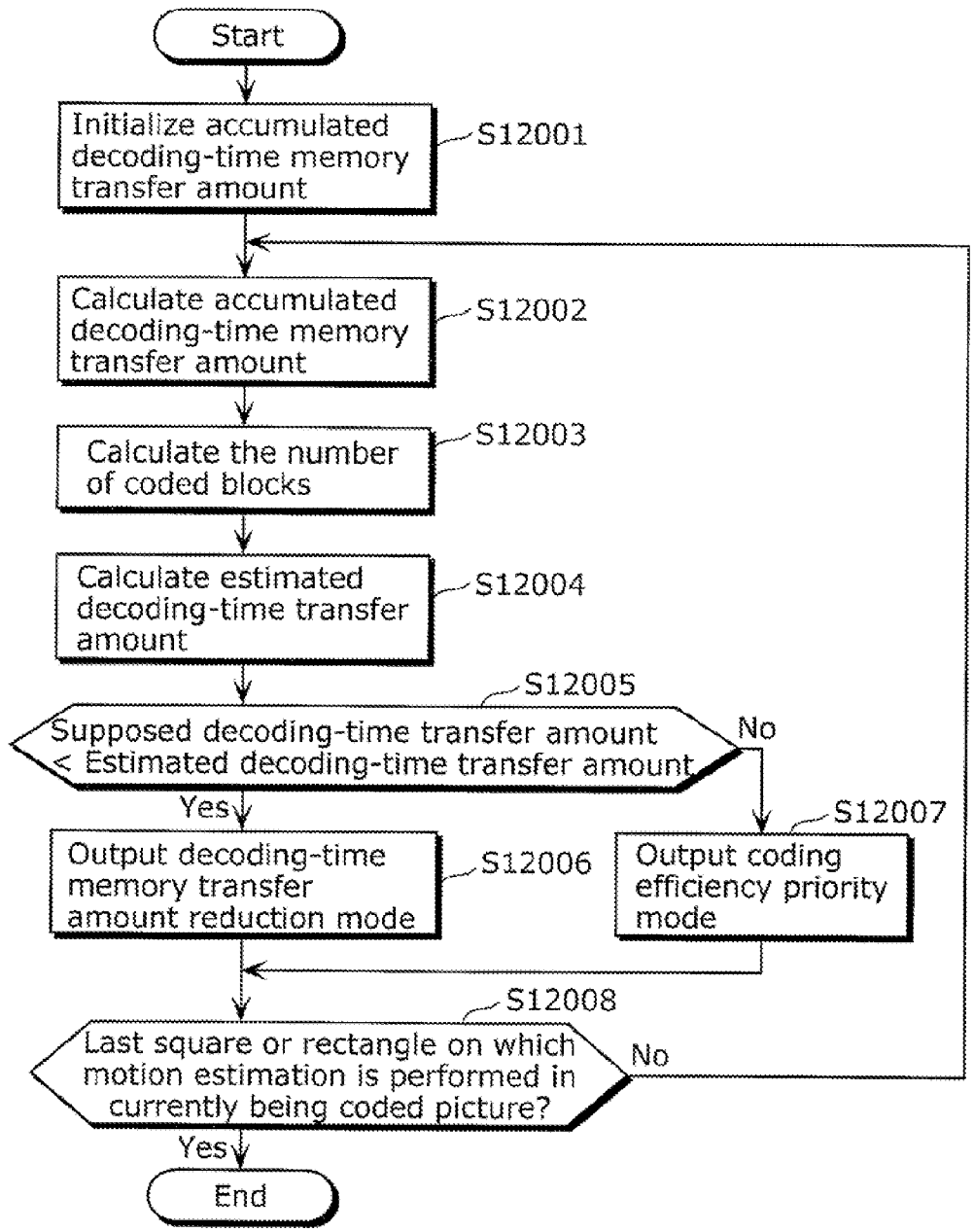
FIG. 12 is a flowchart of mode switching control according to Embodiment 2 of the present invention.

FIG. 12 is a flowchart of mode switching control performed by the search area selecting unit 10002.

How the search area selecting unit 10002 switches modes is described with reference to FIG. 12. Mode switching control is performed for each motion vector generated in motion estimation through coding of a picture.

First, the search area selecting unit 10002 (FIGS. 10, 11) initializes the accumulated decoding-time memory transfer amount at the time of motion estimation of the block that should be coded first in a currently-being coded picture (Step S12001). Next, the search area selecting unit 10002 calculates the accumulated decoding-time memory transfer amount, based on the decoding-time memory transfer amount for each input motion vector (Step S12002). Next, the search area selecting unit 10002 calculates the number of coded blocks, based on the input position information of the currently-being coded block (Step S12003).

In Step S12004, the search area selecting unit 10002 calculates the estimated decoding-time transfer amount, using the value of the accumulated decoding-time memory transfer amount calculated in Step S12002 and the number of coded blocks calculated in Step S12003.

In Step S12005, the search area selecting unit 10002 compares the set supposed decoding-time transfer amount (threshold value) with the estimated decoding-time transfer amount calculated in Step S12004.

In the case where the supposed decoding-time transfer amount is smaller than the estimated decoding-time transfer amount, that is, the estimated decoding-time transfer amount is greater (S12005: Yes), Step S12006 is performed next. In the case where the supposed decoding-time transfer amount is equal to or larger than the estimated decoding-time transfer amount, that is, the supposed decoding-time transfer amount is greater (S12005: No), Step S12007 is performed next.

In Step S12006 that is a process in the case where the estimated decoding-time transfer amount is larger (S12005: Yes), the search area selecting unit 10002 outputs a signal specifying the decoding-time memory transfer amount reduction mode for reducing the transfer amount, to the block reading unit 5003 (FIG. 10) at the later stage, and proceeds to Steps S12008. In addition, in Step S12007 that is a process in the case where the estimated decoding-time transfer amount is smaller (S12005: No), the search area selecting unit 10002 outputs a signal specifying the coding efficiency priority mode to the block reading unit 5003 at the later stage, and proceeds to Steps S12008.

In Step S12008, the search area selecting unit 10002 determines whether or not the current block for which motion estimation is being performed is the fast square or rectangle in the currently-being coded picture, and when the current block is the last square or rectangle, the search area selecting unit 10002 completes this sequential processing. When the current block is not the last square or rectangle (S12008: No), the search area selecting unit 10002 proceeds to Step S12002, and performs the sequential processing on the input of the next decoding-time memory transfer amount for a motion vector.

With the structure, search ranges are narrow compared to search ranges in the case of the coding efficiency priority mode (see the search range 8013x from which the exclusion range 8003x has been excluded). Thus, the search area selecting unit 10002 places a restriction for minimizing the number of blocks, within the current picture, for which the decoding-time memory transfer reduction mode that may decrease the coding efficiency is used (see S12005: No). This makes it possible to control the transfer amount in motion compensation within a certain range (see S12005: Yes), and increase the coding efficiency (see S12005: No).

In this embodiment, the memory in the image decoding apparatus is assumed to be a memory for a 16-bit width and a burst length of 4, but the memory for use here is not limited thereto. In the case of the decoding-time memory transfer amount reduction mode, the area that is excluded from the search range is changed according to the specifications of the memory.

In addition, the method for calculating the estimated decoding-time transfer amount here is intended to calculate an estimated decoding-time transfer amount using proportional calculation based on the number or coded blocks, the number of the blocks in the whole picture, and the accumulated decoding-time memory transfer amount. However, the method is not limited thereto, and calculation other than the proportional calculation is possible.

In addition, the mode selecting unit 11002 is intended to set the reference image data transfer amount in motion compensation in decoding a picture, as the supposed decoding-time transfer amount supposed for the image decoding apparatus which decodes coded images. However, the setting is not limited thereto. The supposed decoding-time transfer amount may be identical for all the pictures or may be different for each picture.

The mode selecting unit 11002 is intended to compare the supposed decoding-time transfer amount with the estimated decoding-time transfer amount, and selects one of the modes. However, when the estimated decoding-time transfer amount exceeds the supposed decoding-time transfer amount once, it is also good to continue the decoding-time memory transfer amount reduction mode until the coding of a picture is completed, without performing calculation of the estimated decoding-time transfer amount and comparison with the supposed decoding-time transfer amount after the time. In this way, it is possible to skip calculation of the estimated decoding-time transfer amount and comparison in size, and thereby reducing the operation amount and power consumption.

In this embodiment, H.264 has been described as an image coding standard. However, image coding standards used here are not limited thereto, and other image coding standards such as MPEG-2 may be used.

In this embodiment, the functional blocks of the image coding apparatus are typically achieved in the form of a program which functions on an information apparatus including a CPU and a memory. However, some or all of these functions may be achieved in the form of LSIs that are integrated circuits. Each of these LSIs may be formed in a single chip, or some or all of these LSIs may be integrated Into a single chip. The name used here is LSI, but it may also be called IC, system LSI, super LSI, or ultra LSI depending on the degree of integration.

Moreover, ways to achieve integration are not limited to the LSI, and special circuit or general purpose processor may also achieve the integration. FPGA that can be programmed after manufacturing LSI or a reconfigurable processor that allows re-configuration of the connection or configuration of LSI cambe used for the same purpose.

Furthermore, advancement in semiconductor technology or emergence of derivative techniques may lead to a new integration technology that replaces LSI in the future. Naturally, such new technology may be used to integrate such functional blocks. For example, specifically, application of biotechnology is one such possibility.

Embodiment 3

As described earlier, each of the image coding apparatuses according to Embodiments 1 and 2 supports a mode for limiting a search range in motion estimation (see the earlier-mentioned decoding-time memory transfer amount reduction mode), and thus is capable of reducing the amount of reference image data in motion compensation which is transferred from an image memory (see the image memory 2002 in FIG. 2, the image memory 6xM In FIG. 6, etc.) in decoding coded images.

However, considering the correlation with the current block to be coded, such mode may decrease the coding efficiency. Such decrease in coding efficiency is caused when the block having the highest correlation within the search range (see search range 8013x in FIG. 8) in the decoding-time memory transfer amount reduction mode has a significantly low correlation within search range (search range 8002) in the coding efficiency priority mode, when the block having the highest correlation within the former search range is compared to the block having the highest correlation within the later search range. This produces adverse effects such as an increase in data size of a coded image, and a decrease in (the image quality of) the decoded image.

To prevent this, there is a demand to achieve both a small decrease in the image quality and a small transfer amount by not always limiting the search ranges, that is, by dynamically switching the decoding-time memory transfer amount reduction mode and the coding efficiency priority mode so as to reduce the amount of reference image data that is transferred from the image memory in motion compensation in decoding. An image coding apparatus according to Embodiment 3 in the present invention is intended to satisfy this demand.

Figure 13:
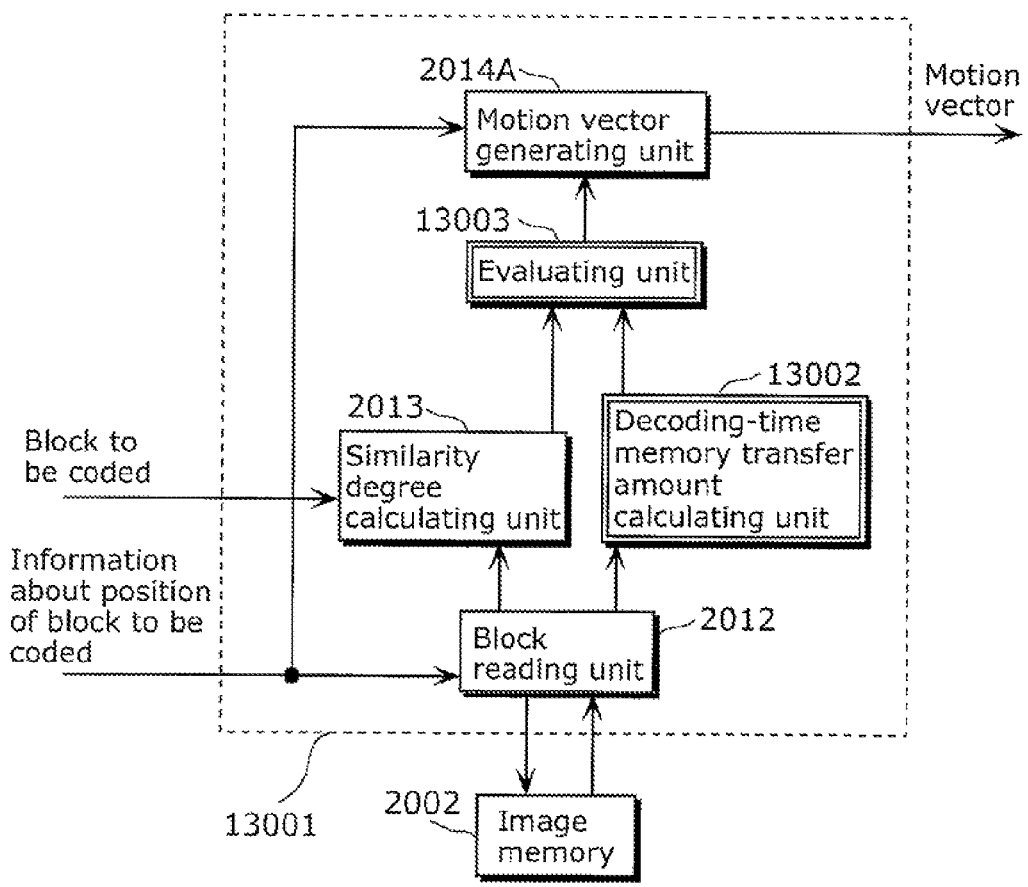
FIG. 13 is a diagram showing an example of an image coding apparatus according to Embodiment 3 of the present invention.

FIG. 13 is a diagram showing an image coding apparatus 13x.

The image coding apparatus 13x according to Embodiment 3 in the present invention has a structure obtained by replacing the motion estimation unit 2001 in the structure in FIG. 2 with the motion estimation unit 13001 in FIG. 13. Compared with the motion estimation unit 2001 in FIG. 2, the motion estimation unit 13001 in FIG. 13 includes a decoding-time memory transfer amount calculating unit 13002, and includes an evaluating unit 13003 instead of the evaluating unit 2014. In FIG. 13, the structural elements which operate as in FIG. 2 that is a structural diagram showing an example of a conventional image coding apparatus are assigned with the same reference numerals, and the descriptions thereof are not repeated where appropriate.

The decoding-time memory transfer amount calculating unit 13002 calculates a decoding-time memory transfer amount for a block in the case where the block is selected as a motion estimation result, based on the position information of the block read out by the block reading unit 2012, (the previously-set information of) the specifications of the image memory in the image decoding apparatus. The position information of the block and the calculated decoding-time memory transfer amount are output to the evaluating unit 13003.

The evaluating unit 13003 receives, from the similarity degree calculating unit 2013, inputs of the current block to be coded and the similarity degree with the block read out by the block reading unit 2012, and receives an input of the decoding-time memory transfer amount from the decoding-time memory transfer amount calculating unit 13002. Next, based on these, the evaluating unit 13003 determines the position of the image resulting from the motion estimation within the search range, and outputs the position information to the motion vector generating unit 2014A.

Various methods are conceivable as a method for determining the position of the image resulting from motion estimation.

One such exemplary method is a method involving setting a coefficient $\alpha$ for a similarity degree and a coefficient $\beta$ for a decoding-time memory transfer amount, calculating an evaluation function value obtained by adding (i) the value obtained by multiplying the similarity degree with the coefficient $\alpha$ and (ii) the value obtained by multiplying the decoding-time memory transfer amount with the coefficient $\beta$, and determining the block having the maximum evaluation function value to be the image resulting from the motion estimation.

In this case, when the coefficient $\alpha$ is a positive number and the coefficient $\beta$ is a negative number, the block having the maximum evaluation function value is a block having a high similarity degree and requiring a small decoding-time memory transfer amount. Furthermore, it is possible to contra which one of the similarity degree and the decoding-time memory transfer amount is prioritized by changing the absolute values of the coefficients $\alpha$ and $\beta$.

For example, the following expressions are possible: Evaluation function value=($\alpha \times$similarity degree)+($\beta \times$decoding-time memory transfer amount); or Evaluation function value=($|\alpha| \times$similarity degree)−($|\beta| \times$decoding-time memory transfer amount).

Figure 14:
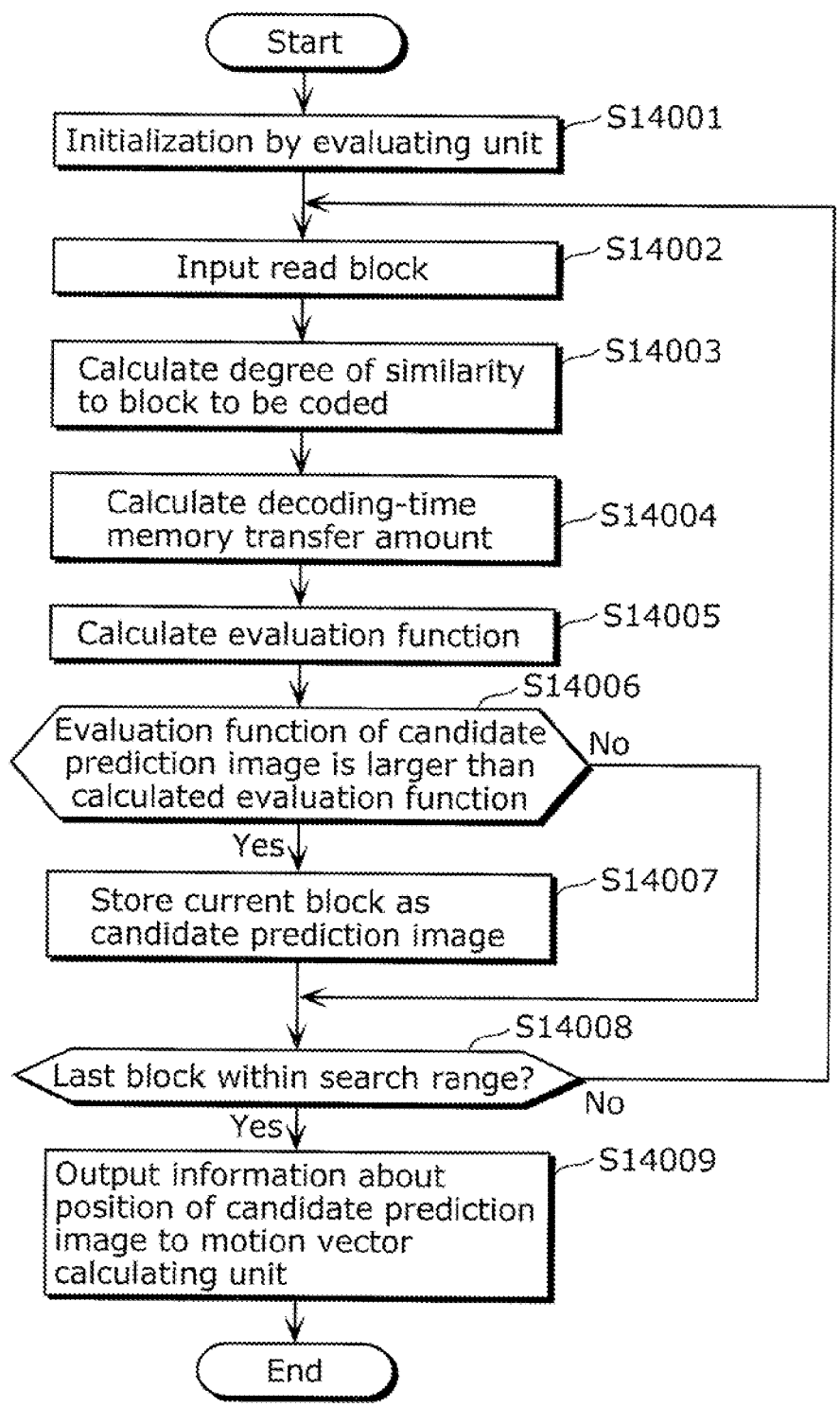
FIG. 14 is a flowchart of prediction image determination performed for each block to be coded according to Embodiment 3 of the present invention.

FIG. 14 is a flowchart of processing performed for each current block to be coded in prediction image determining processes.

The prediction image determining processes performed by the similarity degree calculating unit 2013, the decoding-time memory transfer amount calculating unit 13002, and the evaluating unit 13003 are described with reference to FIG. 14.

First, the evaluating unit 13003 initializes candidate prediction images stored (Step S14001).

Next, the image data and position information of a block read out by the block reading unit 2012 are input (Step S14002).

The similarity degree between the input image data of the block and the current block is calculated (Step S14003).

Next, the decoding-time memory transfer amount is calculated based on the input position information of the block and the specifications of the memory in the image decoding apparatus (Step S14004).

In Step S14005, an evaluation function (value) is calculated using the similarity degree calculated in Step S14003 and the decoding-time memory transfer amount calculated in Step S14004.

In Step S14006, comparison is made on the evaluation function values of the candidate prediction images stored in the evaluating unit 13004 and the evaluation function value calculated in Step S14005.

When the evaluation function value of a candidate prediction image stored in the evaluating unit 13004 is larger (S14006: No), Step S14008 is performed next.

When the evaluation function value calculated in Step S14005 is larger (S14006: Yes), Step S14007 is performed next. In Step S14007, the current block having a larger evaluation function value is determined to be a candidate prediction image, and the evaluating unit 13004 stores the evaluation function value of the block. Next, Step S14008 is performed.

Whether the block input from the block reading unit 2012 is the last block within the search range is determined in Step S14008, and when it is determined that the block is not the last block (S14008: No), the processes starting with Step S14002 are performed on the block input next.

On the other hand, when it is determined that the block is the last block (S14008: Yes), Step S14009 is performed next. In Step S14009, the candidate prediction image stored in the evaluating unit 13004 is determined to be a prediction image, and the position information thereof is output to the motion vector generating (calculating) unit 2014A.

In this way, for example, it is also good to select the block having the maximum evaluation function value from among the plural blocks within the search range.

With this structure, it is possible to reduce the amount of reference image data transferred from an image memory in motion compensation in decoding by not limiting the search ranges and concurrently increasing the coding efficiency.

In this embodiment, the functional blocks of the image coding apparatus are typically achieved in the form of a program which functions on an information apparatus including a CPU and a memory. However, some or all of these functions may be achieved in the form of LSIs that are integrated circuits. Each of these LSIs may be formed in a single chip, or some or all of these LSIs may be integrated into a single chip. The name used here is LSI, but it may also be called IC, system LSI, super LSI, or ultra LSI depending on the degree of integration.

Moreover, ways to achieve integration are not limited to the LSI, and special circuit or general purpose processor may also achieve the integration. FPGA that can be programmed after manufacturing LSI or a reconfigurable processor that allows re-configuration of the connection or configuration of LSI can be used for the same purpose.

Furthermore, advancement in semiconductor technology or emergence of derivative techniques may lead to a new integration technology that replaces LSI in the future. Naturally, such new technology may be used to integrate such functional blocks. Application of biotechnology is one such possibility The image coding apparatus and image decoding apparatus according to the present invention can be applied to various apparatuses which code and/or decode moving pictures according to moving picture coding standards such as H.264 and MPEG-2. Examples of such apparatuses include recording and reproducing apparatuses for digital broadcasting, camcorders, communication apparatuses in television conference systems etc., personal computers, and the like.

Figure 15:
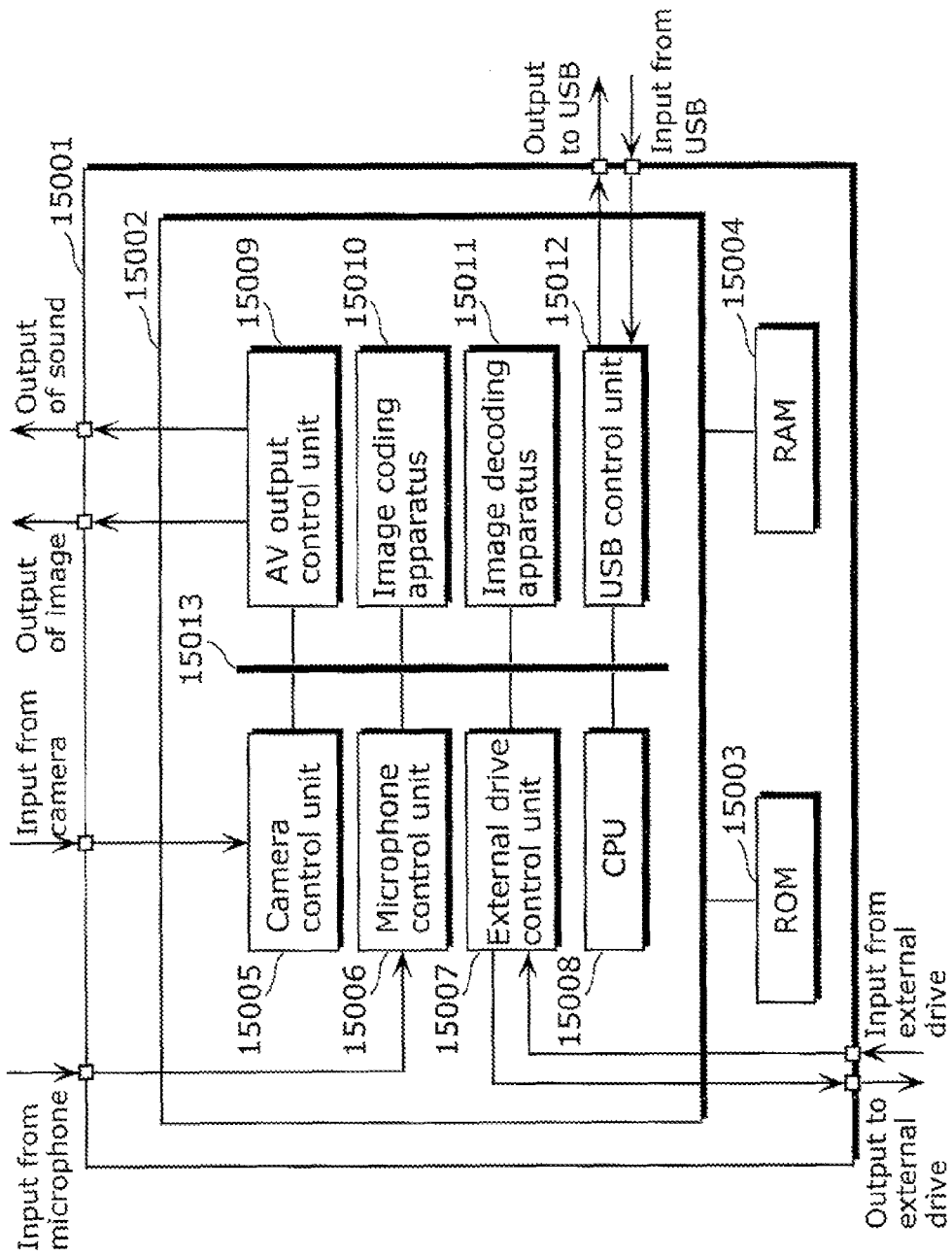
FIG. 15 is a structural diagram of a camcorder.

FIG. 15 is a structural diagram in the case of applying, to a camcorder, the image coding apparatus and the image decoding apparatus to which the present invention is applied.

The camcorder 15001 includes a system LSI 15002, a ROM 15003 including a program and/or data, and a RAM 15004 for use as an image memory or a storage area for various kinds of data.

The system LSI 15002 codes an input signal from a camera and microphones, and outputs a coded image using an external drive and a USB (Universal Serial Bus).

The system LSI 15002 includes a camera control unit 15005 which controls a camera, a microphone control unit 15006 which controls microphones, and an external drive control unit 15007 which controls an external drive. The system LSI 15002 further includes a CPU 15008 which performs integral control, and an AV output control unit 15009 which synchronizes and outputs sound and images.

The system LSI 15002 further includes an image coding apparatus 15010 to which the present invention is applied, an image decoding apparatus 15011, a USB control unit 15012 which controls input and output through a USB, and a system bus 15013 which allows transfer between each module and the ROM 15003 or the RAM 15004.

With the structure of this variation, the above-described image coding apparatus 15010 and the image decoding apparatus 15011 are integrated into the system LSI 15002, and the RAM 15004 is used as the image memory. However, integration methods are not limited thereto. For example, each of the functions may be achieved using a single chip, or some or all of these functions may be integrated into a single chip. Furthermore, when a new circuit integration technique that replaces LSI emerges, such technique may naturally be used for integration. Although the aforementioned camcorder has been taken as an example, the present invention is applicable to recording and reproducing apparatuses for digital broadcasting, communication apparatuses in television conference systems, personal computers, and so on.

In this way, it is also good to prevent a large amount of data of reference images from being transferred from a memory in motion compensation in image decoding. It is also good that the motion estimation unit 5001 in the image coding apparatus includes a search area selecting unit 5002, an image memory 2002, a block reading unit 5003, a similarity degree calculating unit 2013, an evaluating unit 2014, and a motion vector generating unit 2015, and thereby that the motion estimation unit 5001 reduces the amount of reference image data transferred from the memory in motion compensation in decoding a coded image generated by the image coding apparatus by causing the search area selecting unit 5002 to generate a control signal so that the motion estimation is performed without requiring the block reading unit 5003 to read an area that increases the amount of data required to be transferred in motion compensation in decoding the coded image generated by the image coding apparatus.

As a specific example, the image memory $6x$M (FIG. 6, etc.) may be provided outside the image decoding apparatus $6x$ (see the RAM 15004 in FIG. 15), or inside the image decoding apparatus $6x$.

As described above, it is possible to use the information of the specifications of the image memory $6x$M.

It is possible to use information of the specifications of one of image decoding apparatuses which decodes an image coded by the image coding apparatus.

As a specific example, the image decoding apparatus may be an image decoding apparatus (image decoding apparatus 15011) which decodes an image coded by an image coding apparatus (for example, the image coding apparatus 15010) included in a system (for example, the camcorder 15001 in FIG. 15) together with the image decoding apparatus.

The image decoding apparatus having the specifications that are used as such information may be one of the image decoding apparatuses that has been manufactured by a manufacturer of the image coding apparatus and recommended by the manufacturer.

It is to be noted that information (such as the model number, raw specification information, etc.) identifying one of the image decoding apparatuses may be input by a user and then used.

The system may be a system for communicating coded images and decode the communicated images as in systems for television telephones and video conferences.

The system may be a system in which coded images are stored in a storage unit and the stored images are decoded as in systems for camcorders and digital cameras.

As a specific example, images to be coded may be images captured by a camera provided to an interphone, and the images captured during absence of the user may be coded, and the coded images may be stored in the storage unit.

The system may include, for example, a computer such as a personal computer which achieves at least part of the functions of the image coding apparatus and the image decoding apparatus.

Part of or the whole of the Information of the specifications may be information of software for functioning the personal computer as the image decoding apparatus.

The exclusion range 8003$x$ shown in FIG. 8 may be a second exclusion range that includes a first exclusion range and thus larger than the first exclusion range. The first exclusion range is used in an image decoding apparatus of a first kind and the second exclusion range is used in an image decoding apparatus of a second kind. In a frequent case, an image coded in processing based on the exclusion range 8003x is decoded by the image decoding apparatus of the first kind. In another case, the same image may be decoded by the image decoding apparatus of the second kind.

A prediction processing unit 2015x including the motion vector generating unit 2015 (FIG. 5) may be provided. Furthermore, for example, the prediction processing unit 2015x may further include a similarity degree calculating unit 2013, an evaluating unit 2014, a coding processing unit 5M (FIG. 5: see the motion compensation unit 2003 etc. in FIG. 2). For example, the prediction processing unit 2015x may generate a motion vector using the motion vector generating unit 2015, and perform coding with motion estimation using the generated motion vector.

For example, the following operations may be performed by the image coding apparatus (image coding apparatuses 5x, 13x, etc.).

It is possible (for the determining unit 5003bx: FIG. 16, FIG. 17) to determine whether a candidate reference block (block 8R, which is included in a reference image (for example, a reference picture 8001 in FIG. 8) used to code a current image and possibly used to decode the coded image)) is (i) a first block (for example, a block 8007) which requires a transfer in a first transfer amount (size 8S1) smaller than a second transfer amount (threshold value) if the first block is read out, from a decoder-side image storage unit (image memory 6xM), for use in decoding of the coded image in the case where the first block is referred to when the current image is coded, or (ii) a second block (for example, a block 8009) which requires a transfer in the second transfer amount (size 8S2) larger than the first transfer amount (size 8S1) if the second block is read out, from the decoder-side image storage unit (image memory 6xM), for use in decoding of the coded image in the case where the second block is referred to when the current image is coded.

It is good to perform coding using a motion vector (see a motion vector 1007) in the block (the reference block 8R (see the reference block 1006 in FIG. 1) for which the determination has been made) only when the candidate reference block is determined to be the first block, and avoid coding (involving generating a motion vector) with reference to the candidate reference block when the candidate reference block is determined to be the second block (reference by the prediction processing unit 2015x: FIG. 16, FIG. 17, FIG. 5 etc.).

By not performing transfer that requires the large second transfer amount and performing only the transfer that requires the small first transfer amount in this way makes it possible to reduce the transfer amount.

In this operation, many variations are possible in details of such operations.

For example, the fist block (block 8007) that requires the small first transfer amount may be a block that is accessed in the small first access area 8008 (FIG. 6) and has an access unit size 8U (FIG. 8) corresponding to a small first number (for example, one piece) in the reading of the first block.

Likewise, the second block (block 8009) that requires the large second transfer amount may be a block that is accessed in the large second access area 8010 (FIG. 6) and has an access unit size 8U (FIG. 8) corresponding to a large second number (for example, two pieces) in the reading of the second block.

More specifically, the first access area (access area 8008) may be an area including data corresponding to only a comparatively small first number (one piece) of access units 8U (the number x is within a range of 0 to 7 only). Likewise, the second access area (access area 8010) may be an area including data corresponding to the large second number (two pieces) of access units 8U (the number x is within a range of 0 to 7, or a range of 8 to 15). Furthermore, the first block (block 8007) may include pixels (the number x is within a range of 1 to 4) corresponding to the small first number (one piece) of access units 8U (the number x is within a range of 0 to 7 only) in a first access area, whereas the second block may include pixels (the number x is 7, or within a range of =8 to 10) corresponding to the large second number of access units 8U (the number x is within a range of 0 to 7, or a range of 8 to 15).

For example, the first number may be one piece. For example, the range in which the first block is present (the number x is within a range of 0 to 3) may not exceed the boundary (the boundary 6pB, between x=7 and x=8) of access units 8U, and thus not include the boundary between two (or more) access units, whereas the range (the number x is within a range of 7 to 10) in which the second block is present may exceed such a boundary and include the boundary between two (or more) access units.

For example, detailed operations may be the same as the operations in Embodiment 1, Embodiment 2, or Embodiment 3, or may be different from the operations in these embodiments.

For example the determining unit 5003bx (obtaining unit 5003b) may determine whether or not the block is the first block (the first block 8007) within the search range (the first search range 8013x) to be set, or whether the block is the second block (the second block 8009) outside the search range.

For example, it is also good that the determining unit 5003bx (the obtaining unit 5003b) obtains only first pixel data (first pixel data 8007p) in the block (the first block 8007) determined to be the first block, and does not obtain second pixel data (second pixel data 8009p) in the block determined to be the second block (second block 8009) (see Embodiment 1).

For example, the determining unit 5003bx (decoding-time memory transfer amount calculating unit 13002) may determine the block including the obtained pixel data to be the first block that requires the first transfer amount when the small first transfer amount is calculated, and determine the block to be the second block that requires the second transfer amount when the large second transfer amount is calculated.

In the case where the calculated transfer amount is the first transfer amount, the prediction processing unit 2015x (motion vector generating unit 2014A) may determine that the block is the first block based on the calculated transfer amount. Likewise, in the case where the calculated transfer amount is the second transfer amount, the prediction processing unit 2015x may determine the block is the second block based on the calculated transfer amount.

The second block may be, for example, a block having the same similarity degree with the similarity degree of the first block (see S14003). The second block may be part (for example, one) of the plural blocks that are not used for reference. It is possible to assume that the determining unit 5003bx includes the evaluating unit 1300r, etc.

In this way, it is also possible (for the search area selecting unit 5002) to set a first search range that requires the small first transfer amount, specifically, to switch from the second search range that requires the large second transfer amount to the first search range, and possible (for the evaluating unit 2014) to switch to the operation mode to be used, specifically, to switch from the coding efficiency priority mode performed using the second block to the decoding-time transfer amount reduction mode performed without using the second mode. In this way, the transfer amount is reduced after such switching, and an advantageous effect of being able to achieve a high coding efficiency is produced before the switching. Therefore, it is possible to achieve advantageous effects of a small transfer amount and a high coding efficiency.

In this way, it is possible to generate synergy effects by combining plural structural elements according to the techniques in the present invention. In contrast, the prior art does not generate such synergy effects because all or some of the structural elements are missing. This point differentiates the present invention over the prior art.

It is also possible to implement a computer program which achieves the above-described functions, a recording media storing the computer program, an integrated circuit which achieves the functions, and other implementations of different kinds. In addition, it is possible to implement a method including the above-described steps, the aforementioned computer program, various kinds of other methods such as communication methods, a data structure of the aforementioned computer program, and other implementations of different kinds.

Although the present invention has been described up to this point based on the above-described embodiments and variations, the present invention is not limited to the embodiments and variations. Those skilled in the art will readily appreciate that many modifications and variations can be obtained by modifying the exemplary embodiments or variations, or by arbitrarily combining some of the structural elements in the exemplary embodiments and variations without materially departing from the novel teachings and advantages of the present invention. Accordingly, all such modifications and variations are intended to be included within the scope of the present invention.

INDUSTRIAL APPLICABILITY

An image coding apparatus and image decoding apparatus according to the present invention is useful to efficiently decode moving pictures coded by, for example, recording and reproducing apparatuses for digital broadcasting, camcorders, communication apparatuses in television conference systems etc., personal computers, and the like.

REFERENCE SIGNS LIST

1001 Current picture (to be coded)
1002 Current block (to be coded)
1003 Estimation-source picture
1004 Block co-located with current bock (to be coded) within estimation-source picture
1005 Search range
1006 Reference block
1007 Motion vector
2001 Motion estimation unit
2002 Image memory
2003 Motion compensation unit
2004 Intra prediction unit
2005 Prediction scheme selecting unit
2006 Difference image generating unit
2007 Orthogonal transform and quantization unit
2008 Coding unit
2009 Inverse orthogonal transform and inverse quantization unit
2010 Image reconstructing unit
2011 Loop filter unit
2012 Block reading unit
2013 Similarity degree calculating unit
2014 Evaluating unit
2015 Motion vector generating unit
3001 Variable length decoding unit
3002 Motion compensation unit
3003 Motion vector calculating unit
3004 Reference image obtaining unit
3005 Image memory
3006 Prediction image generating unit
3007 Intra prediction unit
3008 Prediction scheme selecting unit
3009 Inverse quantization and inverse orthogonal transform unit
3010 Image reconstructing unit
3011 Loop filter unit
4001 Memory for images of 16×16 pixels
4002 Access-target square or rectangle area (4×4 pixels)
4003 Minimum access area required to access square area 4002 according to memory specifications
5001 Motion estimation unit
5002 Search area selecting unit
5003 Block reading unit
6001 Reference picture
6002 Blocks in reference image
6002P Block to be obtained
6003 Blocks in reference image
6004 Memory for images of 16×16 pixels, included in image decoding apparatus which decodes images coded by image coding apparatus
6005 Access area in the case of reading reference image block 6002 according to memory specifications
6006 Access area in the case of reading reference image block 6003 according to memory specifications
7001 Reference picture
7002 Search range
8001 Reference picture
8002 Search range in coding efficiency priority mode
8003 Range excluded from search range in decoding-time memory transfer amount reduction mode
8004 Range excluded from search range in decoding-time memory transfer amount reduction mode
8005 Range excluded from search range in decoding-time memory transfer amount reduction mode
8006 Memory for images of 16×16 pixels, included in image decoding apparatus which decodes images coded by image coding apparatus
8007 Example of candidate reference image block in decoding-time memory transfer amount reduction mode
8008 Access area in the case of reading exemplary reference image block 8007 according to memory specifications
8009 Example of non-candidate reference image block in decoding-time memory transfer amount reduction mode
8010 Access area in the case of reading block 8009 according to memory specifications
10001 Motion estimation unit
10002 Search area selecting unit
10003 Decoding-time memory transfer amount calculating unit
11001 Data amount update unit
11002 Mode selecting unit
13001 Motion estimation unit
13002 Decoding-time memory transfer amount calculating unit
13003 Evaluating unit
15001 Camcorder
15002 System LSI
15003 ROM
15004 RAM
15005 Camera control unit 15006 Microphone control unit
15007 External drive control unit
15008 CPU
15009 AV output control unit
15010 Image coding apparatus
15011 Image decoding apparatus
15012 USB control unit
15013 System bus
R Search range
8pL Left-top pixel
8pR Right-top pixel

The invention claimed is:

1. An image coding apparatus which codes a current image using motion estimation, said image coding apparatus comprising:
a processor;
a non-transitory memory having stored thereon executable instructions which, when executed by said processor, cause said image coding apparatus to perform:
setting, as a search range for use in motion estimation, a search range that requires a transfer amount smaller than a first threshold value indicating a predetermined amount of data, the transfer amount being an amount of data of a reference image and is to be transferred for use in motion compensation in decoding the coded image;
obtaining, in the motion estimation, pixel data of pixels within the set search range from a memory configured to store the reference image, the reference image including the pixels having the pixel data; and
performing the motion estimation using the obtained pixel data and pixel data of current pixels to be coded,
wherein in the motion compensation in decoding the coded image, the data of the reference image is transferred by transferring, one or more times, image data based on an access unit which is a minimum data amount by which the image data can be read by one-time access, from a decoder-side memory used to store the reference image, and the data of the reference image is used in the motion compensation, and
wherein, in said setting, the transfer amount of the data of the reference image is calculated according to a determination as to whether or not the reference image includes a boundary determined by access units in the decoder-side memory, the determination being made based on the boundary, a position of the reference image indicated by the motion vector, and a size of the reference image.

2. The image coding apparatus according to claim 1,
wherein said setting sets, as the search range in the motion estimation, one of a first search range and a second search range which has been specified as setting from outside said image coding apparatus, and to set the second search range in the case where the second search range is specified, the first search range requiring a transfer in a first transfer amount that is smaller than a second transfer amount, and the second search range requiring a transfer in the second transfer amount that is larger than the first transfer amount.

3. The image coding apparatus according to claim 1,
wherein when setting the search range for the motion estimation, said setting sets the first search range that requires a transfer in a first transfer amount calculated for the motion compensation in the decoding only when the amount of data to be transferred is larger than the second threshold value, and set the second search range that requires a transfer in a second transfer amount when the amount of data to be transferred is smaller than the second threshold value.

4. The image coding apparatus according to claim 1,
wherein the reference image includes a plurality of blocks,
wherein each of the blocks includes a plurality of pixels,
wherein the search range to be set is a range obtained by excluding a predetermined range from a whole range,
wherein a first block in the search range to be set is a block that requires a transfer in a first transfer amount when a first access area having a first size is accessed in reading the first block in the decoding, and
wherein a second block in the excluded predetermined range is a block that requires a transfer in a second transfer amount when a second access area having a second size that is larger than the first size is accessed in reading the second block in the decoding.

5. A camcorder comprising:
the image coding apparatus according to claim 1;
an image decoding apparatus which decodes the image coded by said image coding apparatus; and
a RAM (Random Access Memory) configured to transfer the small amount of data to said image decoding apparatus when the search range that requires the small amount of data to be transferred is set in the decoding, said RAM storing the data to be transferred.

6. The image coding apparatus according to claim 1,
wherein said obtaining includes determining whether a candidate reference block which is included in the reference image used to code the current image and possibly used to decode the coded image is (i) the first block which requires a transfer in a first transfer amount if the first block is read out, from a decoder-side memory, for use in the decoding of the coded image in the case where the first block is referred to when the current image is coded, or (ii) the second block which requires a transfer in a second transfer amount larger than the first transfer amount if the second block is read out, from the decoder-side memory, for use in the decoding of the coded image in the case where the second block is referred to when the current image is coded, and
wherein said performing the motion estimation includes:
generating a motion vector for the current image with reference to the candidate reference block when the candidate reference block is determined to be the first block; and
avoiding generating a motion vector for the current image with reference to the candidate reference block when the candidate reference block is determined to be the second block, and
wherein said obtaining includes identifying whether the determined candidate reference block is the first block located within the set search range or the second block outside the search range.

7. The image coding apparatus according to claim 6,
wherein said obtaining obtains only first pixel data that is pixel data of the reference block determined to be the first block, and does not obtain second pixel data that is pixel data of the candidate reference block determined to be the second block.

8. An image coding apparatus which codes a current image using motion estimation, said image coding apparatus comprising:
a processor;
a non-transitory memory having stored thereon executable instructions which, when executed by said processor, cause said image coding apparatus to perform:

obtaining, in the motion estimation, pixel data of pixels within a search range for use in the motion estimation, from a memory configured to store a reference image including the pixels having the pixel data;

calculating, in the case where the obtained pixel data is determined as a prediction image that is used to generate a difference image in the coding of the current image, a transfer amount of data of a reference image and is to be transferred for use in motion compensation in decoding the coded image obtained using the pixel data as the prediction image; and performing the motion estimation, using the calculated transfer amount, the obtained pixel data, and pixel data of current pixels to be coded, wherein in the motion compensation in decoding the coded image, the data of the reference image is transferred by transferring, one or more times, image data based on an access unit which is a minimum data amount by which the image data can be read by one-time access, from a decoder-side memory used to store the reference image, and the data of the reference image is used in the motion compensation, and wherein, in said calculating, the transfer amount of the data of the reference image is calculated according to a determination as to whether or not the reference image includes a boundary determined by access units in the decoder-side memory, the determination being made based on the boundary, a position of the reference image indicated by the motion vector, and a size of the reference image.

9. An image coding method of coding a current image using motion estimation, said image coding method comprising:

setting, as a search range for use in motion estimation, a search range that requires a transfer amount smaller than a first threshold value indicating a predetermined amount of data, the transfer amount being an amount of data of a reference image and is to be transferred for use in motion compensation in decoding the coded image;

obtaining, in the motion estimation, pixel data of pixels within the set search range from a memory configured to store the reference image, the reference image including the pixels having the pixel data; and performing the motion estimation using the obtained pixel data and pixel data of current pixels to be coded, wherein in the motion compensation in decoding the coded image, the data of the reference image is transferred by transferring, one or more times, image data based on an access unit which is a minimum data amount by which the image data can be read by one-time access, from a decoder-side memory used to store the reference image, and the data of the reference image is used in the motion compensation, and wherein, in said setting, the transfer amount of the data of the reference image is calculated according to a determination as to whether or not the reference image includes a boundary determined by access units in the decoder-side memory, the determination being made based on the boundary, a position of the reference image indicated by the motion vector, and a size of the reference image.

10. An image coding method of coding a current image using motion estimation, said image coding method comprising:

obtaining, in the motion estimation, pixel data of pixels within a search range for use in the motion estimation, from a memory configured to store a reference image including the pixels having the pixel data;

in the case where the obtained pixel data is determined as a prediction image that is used to generate a difference image in the coding of the current image, calculating a transfer amount of data of the reference image and is to be transferred for use in motion compensation in decoding the coded image obtained using the pixel data as the prediction image; and performing the motion estimation, using the calculated transfer amount, the obtained pixel data, and pixel data of current pixels to be coded, wherein in the motion compensation in decoding the coded image, the data of the reference image is transferred by transferring, one or more times, image data based on an access unit which is a minimum data amount by which the image data can be read by one-time access, from a decoder-side memory used to store the reference image, and the data of the reference image is used in the motion compensation, and wherein, in said calculating, the transfer amount of the data of the reference image is calculated according to a determination as to whether or not the reference image includes a boundary determined by access units in the decoder-side memory, the determination being made based on the boundary, a position of the reference image indicated by the motion vector, and a size of the reference image.

11. An integrated circuit which codes a current image using motion estimation, said integrated circuit comprising:

a processor;

a non-transitory memory having stored thereon executable instructions which, when executed by said processor, cause said integrated circuit to perform:

setting, as a search range for use in motion estimation, a search range that requires a transfer amount smaller than a first threshold value indicating a predetermined amount of data, the transfer amount being an amount of data of a reference image and is to be transferred for use in motion compensation in decoding the coded image;

obtaining, in the motion estimation, pixel data of pixels within the set search range from a memory configured to store the reference image, the reference image including the pixels having the pixel data; and performing the motion estimation using the obtained pixel data and pixel data of current pixels to be coded, wherein in the motion compensation in decoding the coded image, the data of the reference image is transferred by transferring, one or more times, image data based on an access unit which is a minimum data amount by which the image data can be read by one-time access, from a decoder-side memory used to store the reference image, and the data of the reference image is used in the motion compensation, and wherein, in said setting, the transfer amount of the data of the reference image is calculated according to a determination as to whether or not the reference image includes a boundary determined by access units in the decoder-side memory, the determination being made based on the boundary, a position of the reference image indicated by the motion vector, and a size of the reference image.

12. An integrated circuit which codes a current image using motion estimation, said integrated circuit comprising:
a processor;
a non-transitory memory having stored thereon executable instructions which, when executed by said processor, cause said integrated circuit to perform:
obtaining in the motion estimation, pixel data of pixels within a search range for use in the motion estimation, from a memory configured to store a reference image including the pixels having the pixel data;
in the case where the obtained pixel data is determined as a prediction image that is used to generate a difference image in the coding of the current image, calculating a transfer amount of data of the reference image and is to be transferred for use in motion compensation in decoding the coded image obtained using the pixel data as the prediction image; and
performing the motion estimation, using the calculated transfer amount, the obtained pixel data, and pixel data of current pixels to be coded,
wherein in the motion compensation in decoding the coded image, the data of the reference image is transferred by transferring, one or more times, image data based on an access unit which is a minimum data amount by which the image data can be read by one-time access, from a decoder-side memory used to store the reference image, and the data of the reference image is used in the motion compensation, and
wherein, in said calculating, the transfer amount of the data of the reference image is calculated according to a determination as to whether or not the reference image includes a boundary determined by access units in the decoder-side memory, the determination being made based on the boundary, a position of the reference image indicated by the motion vector, and a size of the reference image.

13. A non-transitory computer readable recording medium having stored thereon a computer program for causing a computer to code an image using motion estimation, wherein, when executed, said computer program causes the computer to perform a method comprising:
setting, as a search range for use in motion estimation, a search range that requires a transfer amount smaller than a first threshold value indicating a predetermined amount of data, the transfer amount being an amount of data of a reference image and is to be transferred for use in motion compensation in decoding the coded image;
obtaining, in the motion estimation, pixel data of pixels within the set search range from a memory configured to store the reference image, the reference image including the pixels having the pixel data; and
performing the motion estimation using the obtained pixel data and pixel data of current pixels to be coded,
wherein in the motion compensation in decoding the coded image, the data of the reference image is transferred by transferring, one or more times, image data based on an access unit which is a minimum data amount by which the image data can be read by one-time access, from a decoder-side memory used to store the reference image, and the data of the reference image is used in the motion compensation, and
wherein, in said setting, the transfer amount of the data of the reference image is calculated according to a determination as to whether or not the reference image includes a boundary determined by access units in the decoder-side memory, the determination being made based on the boundary, a position of the reference image indicated by the motion vector, and a size of the reference image.

14. A non-transitory computer readable recording medium having stored thereon a computer program for causing a computer to code an image using motion estimation, wherein, when executed, said computer program causes the computer to perform a method comprising:
obtaining, in the motion estimation, pixel data of pixels within a search range for use in the motion estimation, from a memory configured to store a reference image including the pixels having the pixel data;
in the case where the obtained pixel data is determined as a prediction image that is used to generate a difference image in the coding of the current image, calculating a transfer amount of data of the reference image and is to be transferred for use in motion compensation in decoding the coded image obtained using the pixel data as the prediction image; and
performing the motion estimation, using the calculated transfer amount, the obtained pixel data, and pixel data of current pixels to be coded,
wherein in the motion compensation in decoding the coded image, the data of the reference image is transferred by transferring, one or more times, image data based on an access unit which is a minimum data amount by which the image data can be read by one-time access, from a decoder-side memory used to store the reference image, and the data of the reference image is used in the motion compensation, and
wherein, in said calculating, the transfer amount of the data of the reference image is calculated according to a determination as to whether or not the reference image includes a boundary determined by access units in the decoder-side memory, the determination being made based on the boundary, a position of the reference image indicated by the motion vector, and a size of the reference image.

15. A recording and reproducing apparatus which records an image coded using motion estimation, and reproduces a decoded image obtained by decoding the coded image, said recording and reproducing apparatus comprising:
a processor;
a non-transitory memory having stored thereon (i) a reference image used in the motion estimation and (ii) executable instructions which, when executed by said processor, cause said recording and reproducing apparatus to perform:
setting, as a search range for use in motion estimation, a search range that requires a transfer amount smaller than a first threshold value indicating a predetermined amount of data, the transfer amount being an amount of data of the reference image and is to be transferred for use in motion compensation in decoding the coded image;
obtaining, in the motion estimation, pixel data of pixels within the set search range from said non-transitory memory configured to store the reference image, the reference image including the pixels having the pixel data; and
performing the motion estimation using the obtained pixel data and pixel data of current pixels to be coded,
wherein in the motion compensation in decoding the coded image, the data of the reference image is transferred by transferring, one or more times, image data based on an access unit which is a minimum data amount by which the image data can be read by one-time access, from a decoder-side memory used to store the reference image, and the data of the reference image is used in the motion compensation, and wherein, in said setting, the transfer amount of the data of the reference image is calculated according to a determination as to whether or not the reference image includes a boundary determined by access units in the decoder-side memory, the determination being made based on the boundary, a position of the reference image indicated by the motion vector, and a size of the reference image.

16. A recording and reproducing apparatus which records an image coded using motion estimation, and reproduces a decoded image obtained by decoding the coded image, said recording and reproducing apparatus comprising:

a processor;

a non-transitory memory having stored thereon (i) a reference image used in the motion estimation and (ii) executable instructions which, when executed by said processor, cause said recording and reproducing apparatus to perform:

setting, as a search range for use in motion estimation, a search range that requires a transfer amount smaller than a first threshold value, the transfer amount being an amount of data of the reference image and is to be transferred for use in motion compensation in decoding the coded image;

obtaining, in the motion estimation, pixel data of pixels within the set search range from said non-transitory memory configured to store the reference image, the reference image including the pixels having the pixel data; and performing the motion estimation using the obtained pixel data and pixel data of current pixels to be coded, wherein in the motion compensation in decoding the coded image, the data of the reference image is transferred by transferring, one or more times, image data based on an access unit which is a minimum data amount by which the image data can be read by one-time access, from a decoder-side memory used to store the reference image, and the data of the reference image is used in the motion compensation, and wherein, in said calculating, the transfer amount of the data of the reference image is calculated according to a determination as to whether or not the reference image includes a boundary determined by access units in the decoder-side memory, the determination being made based on the boundary, a position of the reference image indicated by the motion vector, and a size of the reference image.

\* \* \* \* \*